US008823832B2

(12) United States Patent
Takakura et al.

(10) Patent No.: US 8,823,832 B2
(45) Date of Patent: Sep. 2, 2014

(54) IMAGING APPARATUS

(75) Inventors: Kentaro Takakura, Osaka (JP); Kenji Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 27 days.

(21) Appl. No.: 13/612,102

(22) Filed: Sep. 12, 2012

(65) Prior Publication Data

US 2013/0002905 A1    Jan. 3, 2013

(30) Foreign Application Priority Data

May 28, 2010    (JP) .................................. 2010-123555

(51) Int. Cl.
    *H04N 5/76*     (2006.01)
    *H04N 5/353*     (2011.01)
    *H04N 1/00*     (2006.01)
    *H04N 1/21*     (2006.01)
    *H04N 7/26*     (2006.01)
    *H04N 5/361*     (2011.01)
    *H04N 101/00*     (2006.01)

(52) U.S. Cl.
    CPC .............. *H04N 1/0044* (2013.01); *H04N 5/353* (2013.01); *H04N 2101/00* (2013.01); *H04N 1/212* (2013.01); *H04N 19/00478* (2013.01); *H04N 5/361* (2013.01)
    USPC .................................................... 348/231.99

(58) Field of Classification Search
    CPC .. H04N 5/533; H04N 19/00479; H04N 5/235
    USPC .................................................... 348/231.99
    See application file for complete search history.

(56) References Cited

U.S. PATENT DOCUMENTS

| 6,906,753 | B1 | 6/2005 | Matoba et al. | |
| 8,023,748 | B2 | 9/2011 | Kato et al. | |
| 2007/0223824 | A1 | 9/2007 | Kato et al. | |
| 2009/0021595 | A1* | 1/2009 | Zandifar et al. | ............ 348/222.1 |
| 2011/0055441 | A1* | 3/2011 | Uchiyama | ....................... 710/68 |

FOREIGN PATENT DOCUMENTS

| JP | 05-176294 A | | 7/1993 |
| JP | 2000-013806 A | | 1/2000 |
| JP | 2007-228515 A | | 9/2007 |
| JP | 2010-074597 A | | 4/2010 |
| JP | 2010074597 A | * | 4/2010 |

OTHER PUBLICATIONS

International Search Report mailed Jun. 7, 2011 issued in corresponding Internation Application No. PCT/JP2011/002527.

* cited by examiner

*Primary Examiner* — James Hannett
(74) *Attorney, Agent, or Firm* — McDermott Will & Emery LLP

(57) ABSTRACT

An imaging apparatus includes the following processing units. An imaging device generates first image data according to incident light. A compression unit performs fixed length coding on the first image data to generate first compressed data. A storage unit stores the first compressed data. A de-compression unit de-compresses only first designated data that is a part of the first compressed data so as to generate first partial de-compressed data. A signal processing unit corrects image quality of the first partial de-compressed data to generate first partial corrected image data. A display unit displays the first partial corrected image data.

14 Claims, 23 Drawing Sheets

IMAGING APPARATUS

CROSS REFERENCE TO RELATED APPLICATIONS

This is a continuation application of International Application No. PCT/JP2011/002527 filed on May 2, 2011, designating the United States of America, which is based on and claims priority of Japanese Patent Application No. 2010-123555 filed on May 28, 2010. The entire disclosures of the above-identified applications, including the specifications, drawings and claims are incorporated herein by reference in their entirety.

TECHNICAL FIELD

The present invention relates to imaging apparatuses, and more particularly to an imaging apparatus that performs fixed length coding on image data.

BACKGROUND

In recent years, with the increase of the number of pixels in imaging devices used in imaging apparatuses such as a digital still camera and a digital camcorder, an image data amount processed by integrated circuits embedded in such imaging apparatuses has also been increased. In order to process a large amount of data, a faster operation frequency, a larger memory capacity, and the like are considered to assure a bus width for data transfer in such an integrated circuit. However, they result directly in cost increase of the imaging apparatuses.

Generally, imaging apparatuses such as a digital still camera and a digital camcorder compress data, for which all image processes have been performed in integrated circuits, to be recorded onto external recording apparatuses such as a Secure Digital (SD) card. Therefore, the external recording apparatus having the same capacity can store image data having a larger size than non-compressed one or image data having more pictures. The compression is performed by using coding methods such as Joint Photographic Experts Group (JPEG) or Moving Picture Experts Group (MPEG).

Patent Literature 1 discloses that image data compression is performed also on pixel signals (raw data) provided from an imaging device. As a result, even if the advance of pixel increase in imaging devices increases load on signal processing, this technique can achieve high-speed operations by decreasing a bus bandwidth required for memory writing/reading. In addition, the technique adopts the fixed length coding method to assure a bus bandwidth and reduce a compression processing amount. In the method, a maximum value and a minimum value are calculated from pixel data in a given image region to determine a local dynamic range in the region, and then a value calculated by subtracting the minimum value from all pixels in the region is quantized with a quantization width according to the dynamic range. As a result, fixed length coding is achieved.

However, the imaging apparatus disclosed in Patent Literature 1 quantizes a difference value between a pixel and a minimum value in the same region, so that as the dynamic range in the region is increased, the quantization width is increased. This technique utilizes visual characteristics that as a dynamic range in a region is larger, the image is likely to have a large change so that a subtle level change is unlikely to be perceived. However, in the calculation of a minimum value and a maximum value in a region, there is a problem that compression cannot start until all pixels in the region are obtained. Therefore, although a bus bandwidth can be decreased, processing is delayed until pixels in the region are obtained. As a result, in the structure, another memory is necessary to store the pixels in the region, and thereby a circuit size is increased.

Patent Literature 2 discloses that a fixed length coding unit divides image data into unit blocks each having a small region regarding input pixel signals (raw data) received from an imaging device, then calculates an average value level of the image data in each unit block, and performs fixed length coding on the average value level, and an exposure control unit calculates a luminance level of the entire image data in each unit block based on the average value level and controls an exposure amount of an imaging apparatus so that the image data has a predetermined luminance level.

CITATION LIST

Patent Literatures

Patent Literature 1: Japanese Unexamined Patent Application Publication No. 2007-228515
Patent Literature 2: Japanese Unexamined Patent Application Publication No. 2000-013806

SUMMARY

Technical Problem

However, the imaging apparatus disclosed in Patent Literature 1 provides the compressed fixed length coded data to a memory such as a Synchronous Dynamic Random Access Memory (SDRAM), then reads the fixed length coded data from the memory, de-compresses it, and performs subsequent image processing. This is because due to the recent data amount increase, the processing would fail when a subsequent process is delayed for each process. The processing via a memory enables the structure not to limit a processing speed.

However, this structure adds de-compressing of compressed data as well as the memory writing/reading, so that it takes a time from actual image capturing to displaying. Therefore, this structure has a problem of lacking a display responsiveness.

The imaging apparatus disclosed in Patent Literature 2 calculates an average value for each unit block of the image as well as fixed length coding data generated by compressing image data, and then controls an exposure amount based on the average value. However, in the same manner as Patent Literature 1 for image data, the imaging apparatus disclosed in Patent Literature 2 reads fixed length coded data from a memory and then de-compresses it to be displayed. Therefore, like Patent Literature 1, the imaging apparatus disclosed in Patent Literature 2 also has the problem of lacking a display responsiveness.

In order to solve the above conventional problems, an object of the present invention is to provide an imaging apparatus capable of improving a display responsiveness.

Solution to Problem

In accordance with an aspect of the present invention for achieving the object, there is provided an imaging apparatus including: an imaging device that generates first image data according to incident light; a compression unit configured to perform fixed length coding on the first image data to generate first compressed data; a storage unit configured to store the first compressed data; a de-compression unit configured to de-compress only first designated data that is a part of the first compressed data so as to generate first partial de-compressed data; a signal processing unit configured to correct image quality of the first partial de-compressed data to generate first partial corrected image data; and a display unit configured to display the first partial corrected image data.

With the structure, the imaging apparatus according to the aspect of the present invention de-compresses only a part of the compressed data and displays the de-compressed data. The imaging apparatus according to the aspect of the present invention can therefore improve a display responsiveness.

It is possible that the de-compression unit is configured, after generating the first partial de-compressed data, to de-compress the first compressed data in whole stored in the storage unit to generate first entire de-compressed data, and the signal processing unit is configured to correct image quality of the first entire de-compressed data to generate first entire corrected image data.

With the above structure, the imaging apparatus according to the aspect of the present invention can achieve both higher-speed displaying and larger-amount data processing.

It is further possible that the compression unit is configured, per pixel data group that is a part of pieces of pixel data included in the first image data, to compress pieces of pixel data included in the pixel data group so as to generate pieces of unit compressed data each having a fixed length, and the first designated data is a part of each of the pieces of unit compressed data.

With the above structure, the imaging apparatus according to the aspect of the present invention can display image of captured image data with a lower resolution at a high speed.

It is still further possible that the compression unit is configured to calculate bit change information indicating a difference between a prediction value and pixel data of a current pixel to be coded, and quantize the calculated bit change information to obtain a quantized value having a fixed length, each of the pieces of unit compressed data includes: a reference pixel value that is pixel data to be used as the prediction value; quantization values including the quantized value which correspond to pieces of the pixel data included in the pixel data group; and quantization information indicating conditions of the quantization, and the first designated data includes the reference pixel value.

It is still further possible that the reference pixel value is one piece of pixel data included in the pixel data group, and each of the pieces of unit compressed data includes: the reference pixel value; the quantized values corresponding to pieces of the pixel data included in the pixel data group except the one piece of pixel data; and the quantization information.

With the above structure, the imaging apparatus according to the aspect of the present invention can display image generated by thinning pixels out from the captured image data.

It is still further possible that the compression unit is configured to calculate an average value of the pieces of pixel data included in the pixel data group, and the reference pixel value is the average value.

With the above structure, the imaging apparatus according to the aspect of the present invention can display image with suppressed aliasing by using information from all pixels in the pixel data.

It is still further possible that the compression unit is configured to calculate an average value of the pieces of pixel data included in the pixel data group, and the reference pixel value is the average value.

With the above structure, the imaging apparatus according to the aspect of the present invention can display with suppressed noise.

It is still further possible that each of the pieces of pixel data is in corresponding one of different colors, each of the pieces of unit compressed data includes respective reference pixel values in the different colors, the first designated data includes respective reference pixel values in the different colors, and the compression unit is configured to calculate the bit change information by using, as the prediction value, the reference pixel value in a same color as a color of the current pixel, and quantizes the calculated bit change information to obtain the quantized values having the fixed length.

With the above structure, the imaging apparatus according to the aspect of the present invention can improve a display responsiveness of color images.

It is still further possible that the imaging device further generates second image data according to another incident light, the compression unit is further configured to perform fixed length coding on the second image data to generate second compressed data, the storage unit is further configured to store the second compressed data, the de-compression unit is further configured to de-compress only second designated data that is a part of the second compressed data so as to generate second partial de-compressed data, the signal processing unit is further configured to correct image quality of the second partial de-compressed data to generate second partial corrected image data, the display unit is further configured to display the second partial corrected image data, the de-compression unit is configured, after generating the first partial de-compressed data and the second partial de-compressed data, to generate the first entire de-compressed data and de-compress the second compressed data in whole stored in the storage unit to generate second entire de-compressed data, and the signal processing unit is further configured to correct image quality of the second entire de-compressed data to generate second entire corrected image data.

With the above structure, the imaging apparatus according to the aspect of the present invention can improve a display responsiveness in the case of continuous image capturing.

It is still further possible that the imaging apparatus further includes an exposure control unit configured to calculate a luminance level of the first image data using the first partial de-compressed data, and control an exposure amount of the imaging device so that the first image data has a predetermined luminance level.

With the above structure, the imaging apparatus according to the aspect of the present invention can realize high-speed exposure control.

It is still further possible that the imaging apparatus further includes a focus control unit configured to calculate frequency properties of image data included in the first partial de-compressed data, and control focus by using the frequency properties.

With the above structure, the imaging apparatus according to the aspect of the present invention can realize high-speed focus control.

It is still further possible that the first image data includes pieces of light-blocking pixel data of light-blocking pixels, and the compression unit is configured, when the pieces of pixel data included in the pixel data group are the pieces of light-blocking pixel data, to calculate, per predetermined-number of light-blocking pixels, an average value of pieces of the light-blocking pixel data, and perform fixed length coding on the calculated averaged values to generate the first compressed data.

With the above structure, the imaging apparatus according to the aspect of the present invention can reduce a data amount of compressed data by suppressing image quality deterioration.

It is still further possible that the first image data includes pieces of light-blocking pixel data of light-blocking pixels, and the compression unit is configured, when the pieces of pixel data included in the pixel data group are the pieces of light-blocking pixel data, to calculate, per predetermined-number of light-blocking pixels, one of a maximum value and a minimum value of pieces of the light-blocking pixel data, and perform fixed length coding on one of the calculated maximum values and the calculated minimum values to generate the first compressed data.

With the above structure, the imaging apparatus according to the aspect of the present invention can reduce a data amount of compressed data by suppressing image quality deterioration.

It is sill further possible that the imaging apparatus further includes an analog-to-digital (AD) conversion unit configured to convert the first image data generated by the imaging device into digital signals, wherein the compression unit is configured to compress the first image data converted by the AD conversion unit into the digital signals so as to generate the first compressed data having a fixed length.

It should be noted that the present invention can be implemented not only as the above-described imaging apparatus, but also as: an image processing method including steps performed by the characteristic units of the imaging apparatus: and a program causing a computer to execute the characteristic steps. Of course, the program can be distributed via a recording medium such as a Compact Disc-Read Only Memory (CD-ROM) or via a transmission medium such as the Internet The present invention can be implemented as also as a semiconductor integrated circuit (LSI) to achieve a part of all of the functions of the imaging apparatus, or an imaging system including the imaging apparatus.

Advantageous Effects

Thus, the present invention can provide an imaging apparatus capable of improving a display responsiveness.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

The following describes the embodiments of the present invention with reference to the drawings. In the following embodiments and variations, the same numeral references are assigned to identical constituent elements having identical functions, so that description of the identical constituent elements is not repeated.

Embodiment 1

The imaging apparatus according to Embodiment 1 of the present invention de-compresses only a part of compressed data and displays the de-compressed data. As a result the imaging apparatus according to the aspect of the present invention can improve a display responsiveness.

Figure 1:
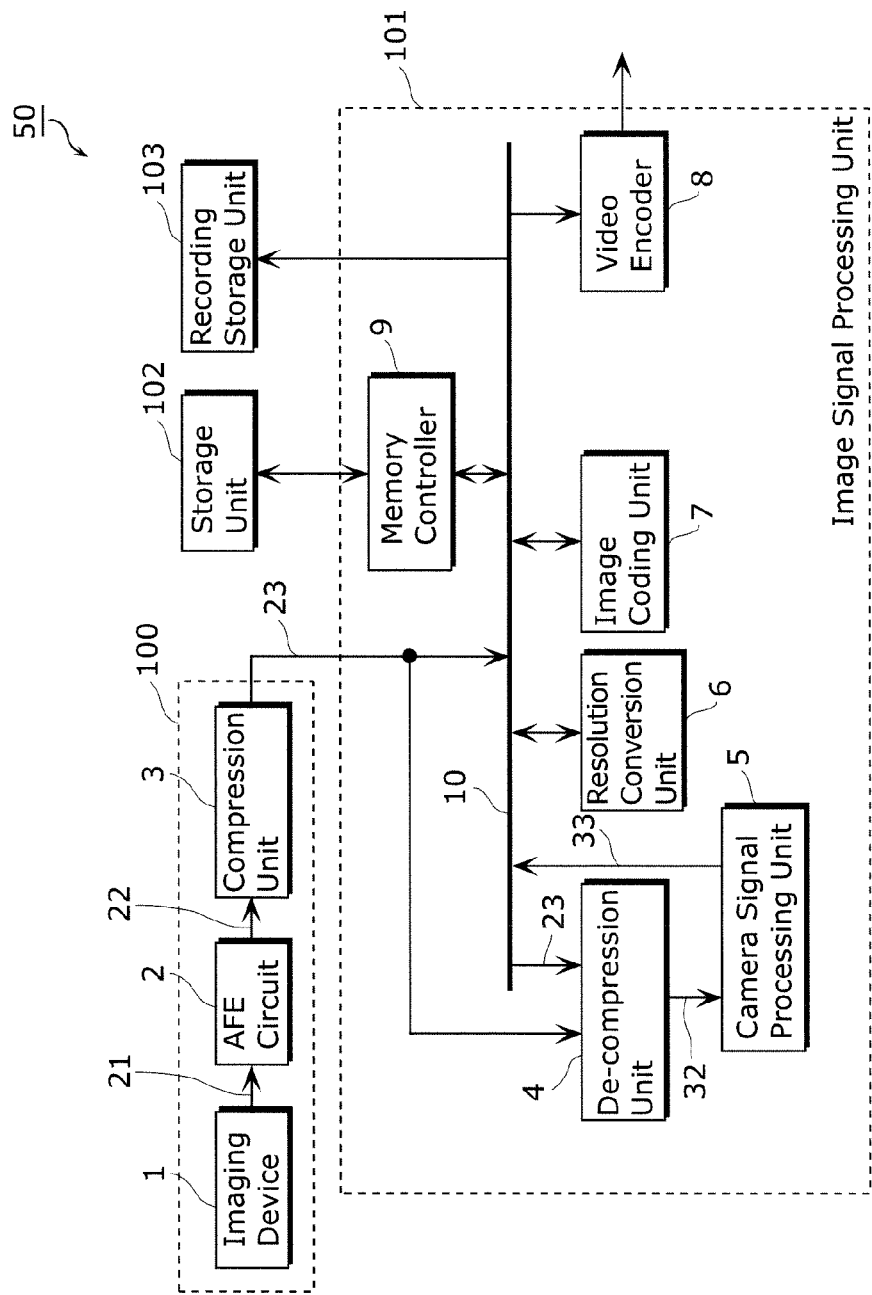
FIG. 1 is a block diagram of an imaging apparatus according to Embodiment 1 of the present invention.

FIG. 1 is a block diagram showing a structure of an imaging apparatus 50 according to Embodiment 1 of the present invention.

It should be noted that a part of all of imaging functions in the imaging apparatus according to the present embodiment is implemented as a program executed by a hardware such as a Large Scale Integration (LSI) or a Central Processing Unit (CPU). The same goes for the other embodiments.

The imaging apparatus 50 shown in FIG. 1 includes an imaging unit 100, an image signal processing unit 101, a storage unit 102, and a recording storage unit 103.

The imaging unit 100 includes an imaging device 1, an Analog Front End (AFE) circuit 2, and a compression unit 3. The image signal processing unit 101 includes a de-compression unit 4, a camera signal processing unit 5, a resolution conversion unit 6, an image coding unit 7, a video encoder 8, and a memory controller 9. Here, the de-compression unit 4, the camera signal processing unit 5, the resolution conversion unit 6, the image coding unit 7, the video encoder 8, and the memory controller 9 are connected to one another via an internal bus 10.

The imaging device 1 generates image data 21 according to incident light. The imaging device 1 is a solid-state imaging device such as a Charge Coupled Devices (CCD) sensor or a Complementary Metal Oxide Semiconductor (CMOS) image sensor. The imaging device 1 converts light incident from an object via a lens block (not shown) into electrical signals so as to generate the image data 21 as analog signals.

The AEF circuit 2 performs signal processing such as noise cancelation, signal amplification, and analog/digital conversion on the image data 21 provided from the imaging device 1 so as to generate image data 22.

The compression unit 3 performs fixed length coding on the image data 22 provided from the AFE circuit 2 to generate compressed data 23.

The following describes the processing performed by the compression unit 3 in more detail.

Figure 2:
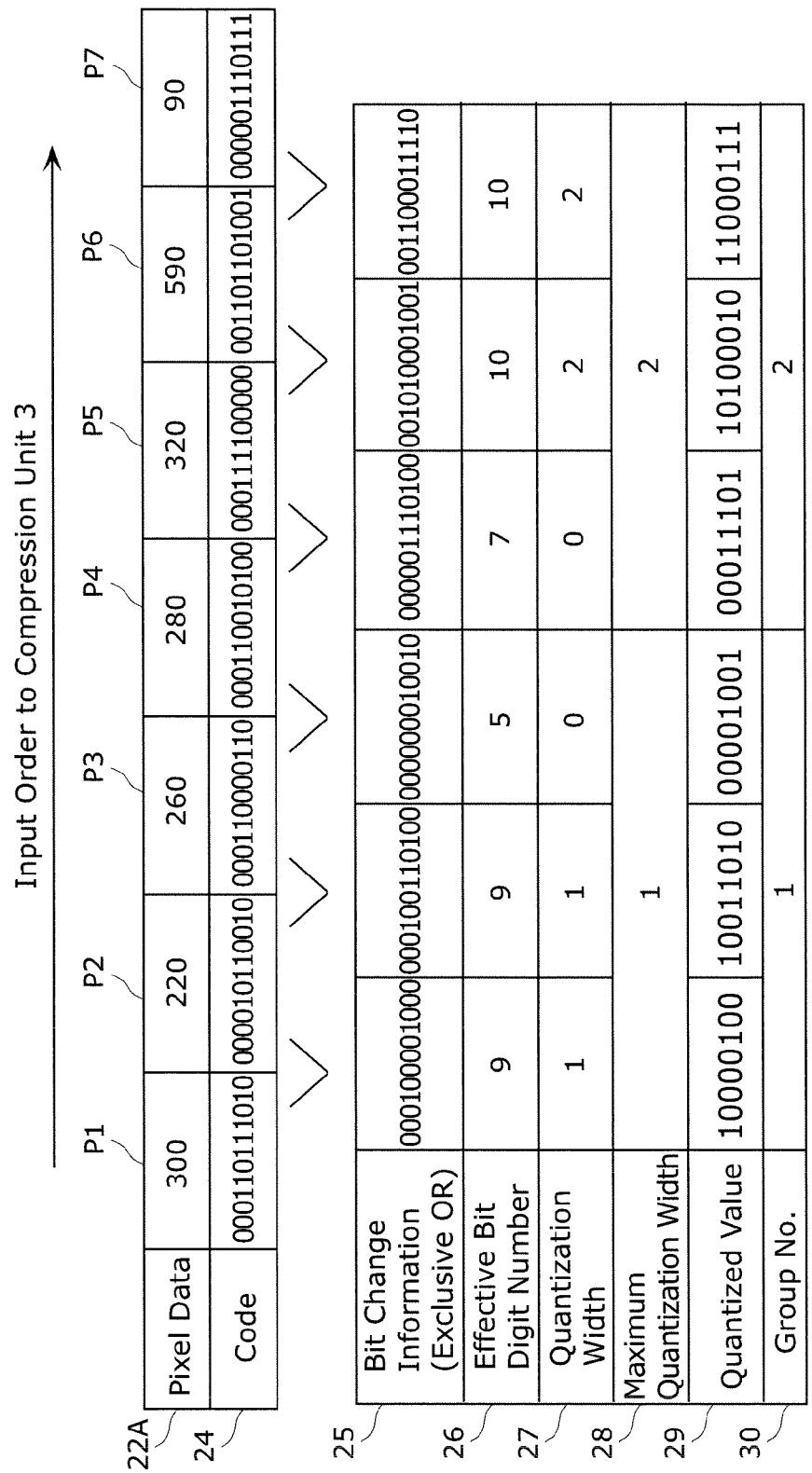
FIG. 2 is a diagram showing an example of compression processing and respective arithmetic operation results according to Embodiment 1 of the present invention.
Figure 3:
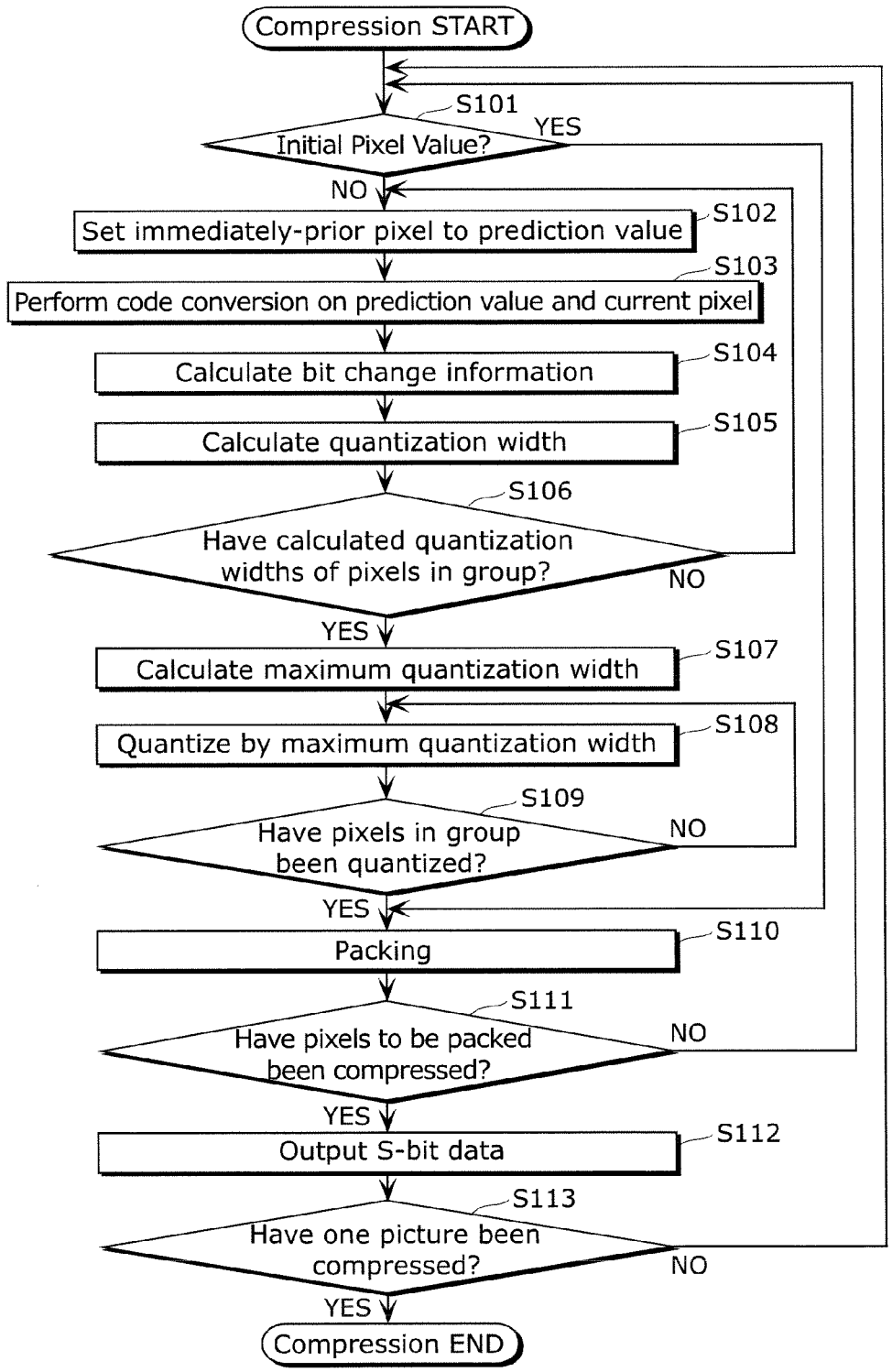
FIG. 3 is a flowchart of compression processing according to Embodiment 1 of the present invention.

FIG. 2 is a diagram for explaining the processing performed by the compression unit 3 according to Embodiment 1 of the present embodiment. FIG. 3 is a flowchart of the processing performed by the compression unit 3 according to Embodiment 1 of the present embodiment.

The image data 22 includes plural pieces of pixel data 22A each having a fixed bit width (N bits) corresponding to one pixel. The compression unit 3 sequentially receives the pieces of pixel data 22A each having this fixed bit width. Here, it is assumed that a data amount of each piece of pixel data 22A is 12 bits (N=12). In other words, a dynamic range of each pixel data 22A is 12 bits. It is also assumed that a bit width M of a quantized value 29 is 8 bits. The compression unit 3 compresses plural pieces of pixel data 22A (a pixel data group) and packs them to have an S-bit fixed length to generate compressed data 23 (hereinafter, referred to as "compressed packing data 23A" or "unit compressed data"). The compression unit 3 provides the compressed data 23 to the image signal processing unit 101. Here, the setting fixed bit S is 64 bits. It should be noted that the fixed bit width N, the quantized value bit width M, and the fixed bit S are not limited to the above examples, as long as they are predetermined.

The code conversion performed in the present embodiment is gray code conversion. The pixel data is gray-coded to suppress a change in bits caused in expressing approximate data and thereby improve a compression rate.

In general, in order to convert a decimal value into a gray code, an exclusive disjunction (exclusive OR) is executed for a bit sequence expressing a decimal value by a binary code. Sequentially from a lower-order bit, the exclusive disjunction is executed on a current-order bit with a next higher-digit bit.

Of course, other code conversion rather than the gray code conversion may be used in the present embodiment as long as the resulting converted code has a smaller bit change in expressing approximate data, in comparison to a bit sequence expressed by a binary code.

FIG. 2 shows seven pieces of pixel data 22A to be compressed into a single compressed packing data 23A, as one example. It is assumed that the pieces of pixel data 22A each corresponding to a pixel are inputted in an order of a pixel P1, a pixel P2, . . . , and a pixel P7. The numeral value assigned with each of the pixels P1 to P7 indicates a signal level of the corresponding pixel data 22A. It is assumed that a piece of pixel data 22A corresponding to the pixel P1 is an initial pixel value 22B. Here, the initial pixel value 22B is a piece of pixel data 22A which is first inputted from among the pieces of pixel data 22A to be packed into a single compressed packing data 23A having S bits.

According to the present embodiment, for example, a prediction value of a current pixel to be coded is assumed to be calculated by using a piece of pixel data 22A of an immediately-left pixel of the current pixel. In other words, it is predicted that there is a high possibility that the piece of pixel data 22A of the current pixel has the same signal level as that of a piece of pixel data 22A of an immediately-prior input pixel.

In compression processing shown in FIG. 3, first, at Step S101, the compression unit 3 determines whether or not an input piece of pixel data 22A is the initial pixel value 22B.

If the input piece of pixel data 22A is the initial pixel value 22B (YES at S101), then the compression unit 3 stores the input initial pixel value 22B into an internal buffer and also provides it to a packing buffer. Then, the processing proceeds to Step S110 described later.

On the other hand, if the input piece of pixel data 22A is not the initial pixel value 22B (NO at S101), then the processing proceeds to Step S102.

Here, it is assumed that the compression unit 3 receives a piece of pixel data 22A which is the initial pixel value 22B and corresponds to the pixel P1. In this case, the compression unit 3 stores the initial pixel value 22B into the internal buffer and also provides it to the packing buffer. If the piece of pixel data 22A has already been stored in the internal buffer, the compression unit 3 overwrites the input piece of pixel data 22A in the internal buffer to be recorded.

Next, it is assumed that the pixel P2 is to be coded. In this case, the compression unit 3 receives a piece of pixel data 22A (current pixel to be coded) which corresponds to the pixel P2. It is also assumed that the current piece of pixel data 22A is "220". In this case, since the input piece of pixel data 22A is not the initial pixel value 22B (NO at S101), the compression unit 3 therefore determines the piece of pixel data 22A of the pixel P2 to be code-converted.

If the determination is made NO at Step S101, then the compression unit 3 determines, as a prediction value, a piece of pixel data 22A of an immediately-prior pixel which is stored in the internal buffer (S102). Here, the prediction value is a value "300" of the piece of pixel data 22A of the pixel P1.

Next, at Step S103, the compression unit 3 performs gray code conversion on the current piece of pixel data and the prediction value to generate a code 24. Here, since the input current piece of pixel data is "220" and the prediction value is "300", the code conversion produces a coded pixel code "000010110010" and a prediction value code "000110111010" each of which is a gray code 24 and has an N ("12") bit length.

Next, at Step S104, the compression unit 3 calculates bit change information 25 indicating a difference (change) between the coded pixel code and the prediction value code. More specifically, the compression unit 3 calculates the bit change information 25 by executing exclusive disjunction between the coded pixel code and the prediction value code. Here, the received coded pixel code is "000010110010" and the prediction value code is "000110111010". Therefore, the compression unit 3 calculates the bit change information 25 "000100001000" by executing exclusive disjunction between the coded pixel code ("000010110010") and the prediction value code ("000110111010").

Next, at Step S105, the compression unit 3 determines a quantization width. In the quantization width determination, the compression unit 3 determines an effective bit digit number 26 of the bit change information 25, namely, a bit length required to express the bit change information 25. More specifically, the effective bit digit number 26 is the number of bits not upper than a current bit that includes a bit indicating the first "1" from higher-order bits. Here, the bit change information 25 is "000100001000". In this case, the effective bit digit number 26 is 9 bits. Then, the compression unit 3 sets a quantization width 27 by subtracting a bit width M of a quantized value from the effective bit digit number 26. Here, assuming that the bit width M of the quantized value is "8", the quantization width 27 is set to "9−8=1".

Furthermore, the compression unit 3 increases compression efficiency by determining the quantization width 27 for each group. Here, one group includes pieces of pixel data 22A in the predetermined number Pix_G. Moreover, pieces of the pixel data 22A belonging to the same group are assigned with the same group number 30.

At Step S106, the compression unit 3 determines whether or not all quantization widths 27 have been determined, for example, for all of the (Pix_G=3) pixels in the group.

If all of the quantization widths 27 in the group have not yet been determined (NO at S106), then the compression unit 3 proceeds to Step S102, and performs Steps S102 to S105 for a next received piece of pixel data 22A.

On the other hand, if all of the quantization widths 27 in the group have already been determined (YES at S106), then the compression unit 3 proceeds to Step S107.

At Step S107, the compression unit 3 calculates a maximum quantization width 28 that is the largest of the quantization widths 27 corresponding the Pix_G pixels in the group. In FIG. 2, the quantization widths 27 having the group number 30 of "1" are "1", "1", and "0", so that the maximum quantization width 28 is "1". The resulting maximum quantization width 28 is used commonly to all of the pixels in the group.

Figure 4:
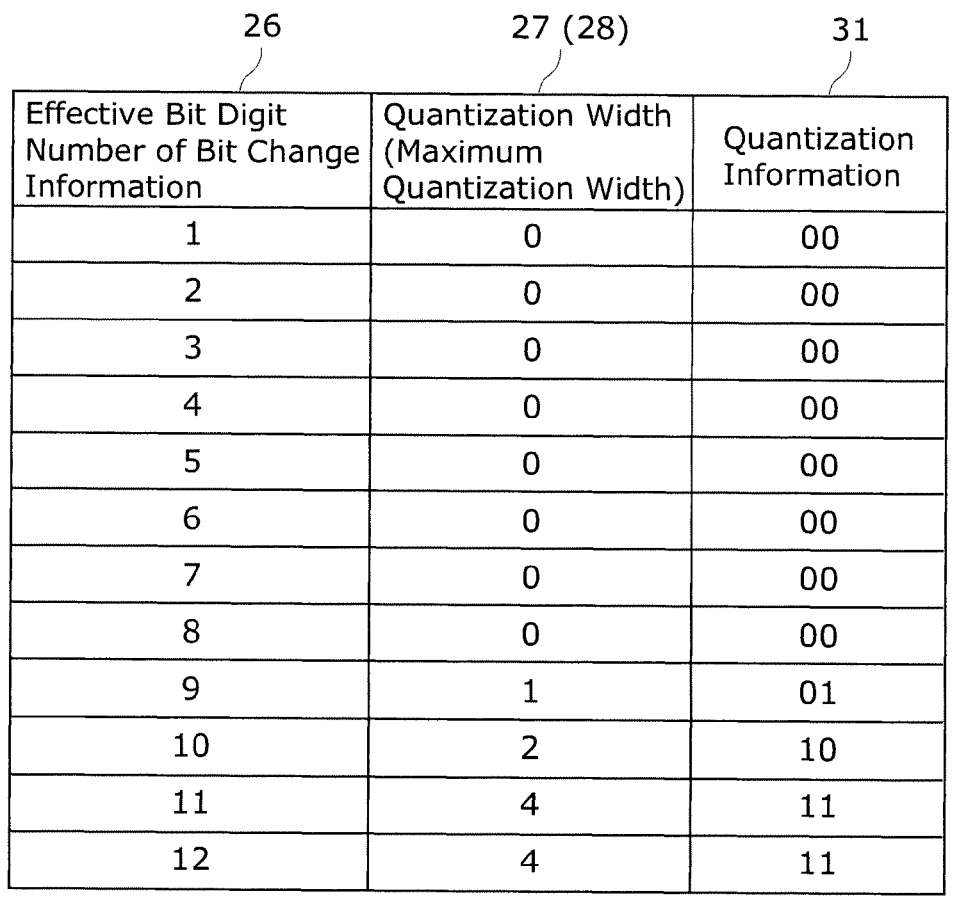
FIG. 4 is a table of an effective bit digit number of bit change information, quantization width, and quantization information according to Embodiment 1 of the present invention.

In addition, the compression unit 3 generates quantization information 31 indicating conditions for quantization. More specifically, the compression unit 3 codes the maximum quantization width 28 to generate quantization information 31 having a Q-bit length. Here, it is assumed that the bit length Q of the quantization information 31 is "2". FIG. 4 is a diagram showing a correspondence relationship among the effective bit digit number 26 of the bit change information 25, the quantization width 27 (maximum quantization width 28), and the quantization information 31 of Q bits. For example, the maximum quantization width 28 is assumed to be "1". In this case, the quantization information 31 is "01" according to FIG. 4. Here, since the maximum quantization width 28 is 0 or a positive number, if the effective bit digit number 26 is smaller than M ("8"), then the quantization width 27 is "0".

Next, at Step S108, the compression unit 3 quantizes the bit change information 25 to generate a quantized value 29. In the quantization, the compression unit 3 shifts bits of the bit change information 25 to lower bits by the maximum quantization width 28, so as to quantize the bit change information 25. Here, the maximum quantization width 28 is "1" and the bit change information 25 is "000100001000". In this case, "000100001000" is shifted to a lower bit by the maximum quantization width 28 ("1") to be "00010000100". Here, since the bit width M of the quantized value is 8 bits, the compression unit 3 provides the bit change information "10000100" quantized from the lowest-order bit to the eighth-order bit, to the packing buffer as the quantized value 29.

Next, at Step S109, the compression unit 3 determines whether or not quantization has been completed for all of the Pix_G pixels in the group.

If the quantization has not yet been completed for all pixels (NO at S109), then the compression unit 3 proceeds to Step S108, and performs Step S108 for a next current pixel data in the same group.

On the other hand, if the quantization has already been completed for all pixels (YES at S109), then the compression unit 3 proceeds to Step S110.

At Step S110, the compression unit 3 packs the resulting pieces of data to have predetermined S bits. In the packing processing, the compression unit 3 stores the initial pixel value 22B (P1) to the packing buffer having the S-bit length, and then stores the Q-bit quantization information 31 and the quantized values 29 of pixels P2 to P4 sequentially to the packing buffer. Here, it is assumed that the fixed bit S is "64" and the bit length Q of the quantization information 31 is "2". Since the quantized value 29 of a current pixel has 8 bits, at the time of processing the Pix_G pieces of pixel data 22A, compressed data of total 38 bits from the beginning of the 64-bit packing buffer (namely, pixel data 22A of pixel P1 (12 bits+ quantization information 31 (2 bits)+quantized values 29 of pixels P2 to P4 (8×3=24 bits) are stored. When the pixels to be processed have been packed, the compression unit 3 proceeds to Step S111.

At Step S111, the compression unit 3 determines whether or not the Pix pieces of pixels to be packed in S bit have already been compressed. Here, it is assumed that the number of pixels "Pix" is previously calculated by the following Equation 1.

$$\text{Pix} = (S - (2 \times Q))/M \quad \text{(Equation 1)}$$

Here, since the fixed bit S is "64", the bit length Q of the quantization information 31 is "2", and the bit width M of the quantized value 29 is 8 bits, the number of pixels "Pix" is 7 pixels according to Equation 1.

If the Pix pixels have not yet been compressed (No at S111), then the compression unit 3 proceeds to Step S101 and performs steps from S101 on a next piece of pixel data 22A. In this case, the compression unit 3 performs steps from S101 on the pixels P5 to P7, and sequentially stores the resulting pieces of data into the buffer memory.

On the other hand, if the Pix pixels have already been compressed (YES at S111), then the compression unit 3 retrieves the compressed data 23 from the buffer memory as compressed packing data 23A having S bits (S112), and then proceeds to Step S113.

At Step S113, the compression unit 3 determines, based on the retrieved compressed packing data 23A, whether or not one picture (one screen image) has been compressed. If one picture has already been compressed (YES at S113), then the compression unit 3 ends the compression processing. On the other hand, if one picture has not yet been compressed (NO at S113), then the compression unit 3 proceeds to Step S101 to perform steps from S101.

As a result of the above-described processing and arithmetic operations, the code 24, the bit change information 25, the effective bit digit number 26, the quantization width 27, and the 8-bit quantized value 29 to be packed regarding each of the pixels P2 to P6 to be processed are shown in FIG. 2.

Figure 5A:
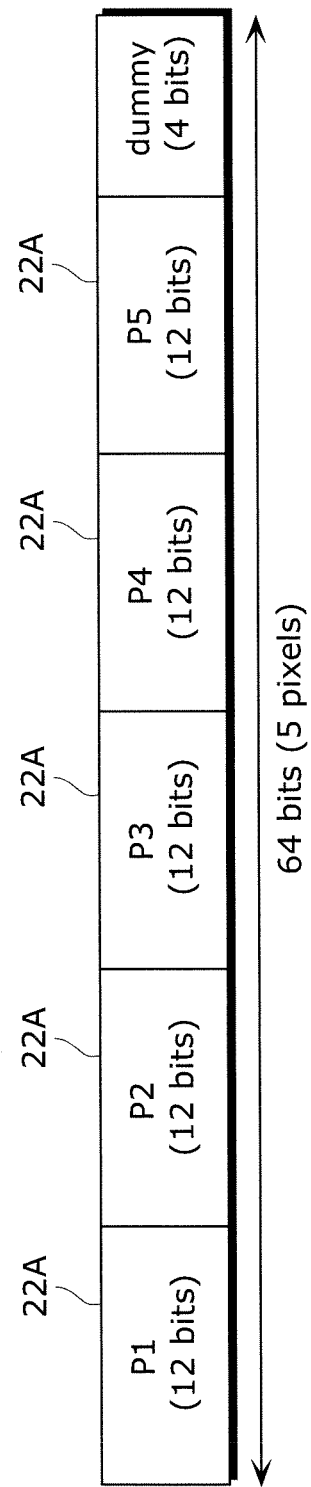
FIG. 5A is a diagram showing an example of data that has not yet been compressed according to Embodiment 1 of the present invention.
Figure 5B:
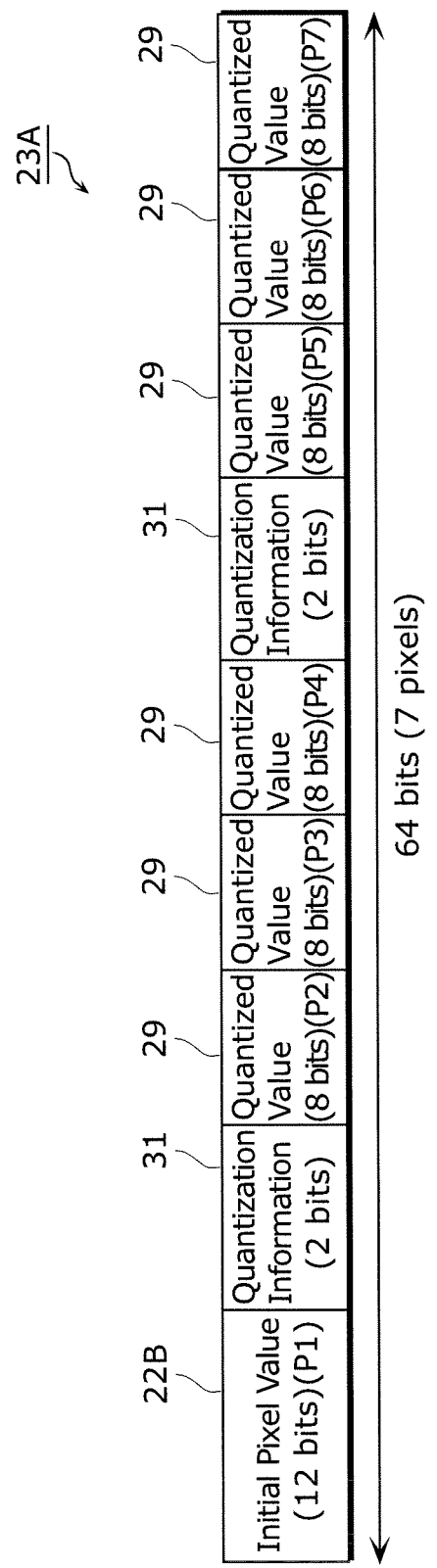
FIG. 5B is a diagram showing an example of compressed packing data according to Embodiment 1 of the present invention.

FIG. 5A is a diagram showing an example of 64-bit packing data for which the above-described compression is not performed. FIG. 5B is a diagram showing an example of 64-bit compressed packing data 23A for which the above-described compression is performed.

If the compression is not performed as shown in FIG. 5A, the 64-bit data is composed of 5-pixel data. On the other hand, if the compression is performed as shown in FIG. 5B, the 64-bit compressed packing data 23A can include 7-pixel data.

Furthermore, in the fixed length coding, if the resulting pieces of coded data having a fixed length are stored into, for example, a memory or the like, it is possible to easily specify a piece of coded data corresponding to a pixel at a specific position in image. As a result, it is possible to maintain random accessibility for the pieces of coded data.

Moreover, according to the present embodiment in which raw data is compressed, it is also possible to generate a prediction value from a neighbor pixel having component of the same color. More specifically, it is assumed that pixels to be coded are pieces of raw data arranged in Bayer pattern. In this case, the piece of raw data can be classified into red (R) components, green (G) components, and blue (B) components. Therefore, the compression unit 3 may use, as a prediction value, a left pixel of the same color, not a neighbor pixel of a current pixel. Since correlativity between pieces of image data is higher, it is possible to increase quantization accuracy in comparison to the case of using a neighbor pixel having a different color component.

Figure 6A:
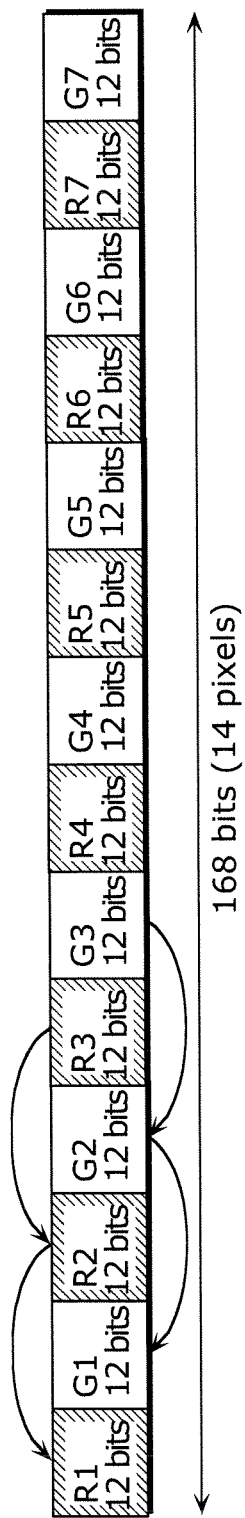
FIG. 6A is a diagram showing an example of data that has not yet been compressed according to Embodiment 1 of the present invention.

FIG. 6A is a diagram showing a relationship in pixels used as prediction values for respective pieces of raw data arranged in Bayer pattern. For example, as shown in FIG. 6A, the pixel R2 uses, as a prediction value, a piece of pixel data 22A of a pixel R1 that is the closest left pixel having the same color.

Figure 6B:
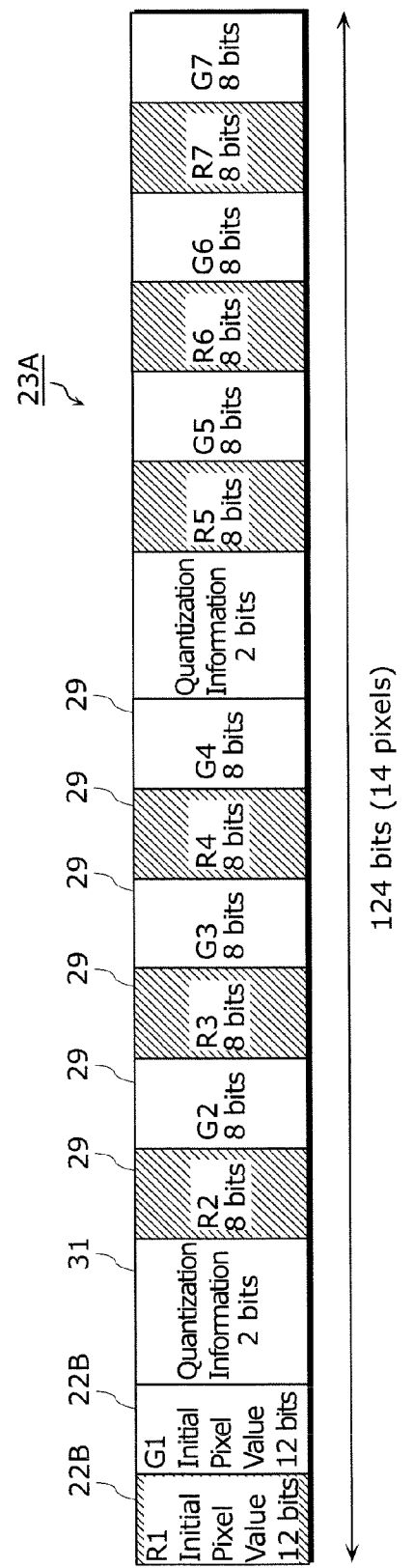
FIG. 6B is a diagram showing an example of compressed packing data according to Embodiment 1 of the present invention.

Furthermore, FIG. 6A is a diagram showing a data example in the case where the above-described compression is not performed for the pieces of raw data arranged in Bayer pattern. FIG. 6B is a diagram showing an example of the compressed packing data 23A in the case where the above-described compression is performed for the pieces of raw data arranged in Bayer pattern. Each of FIGS. 6A and 6B shows a data amount of 14 pixels.

If the compression is not performed as shown in FIG. 6A, 168-bit data is necessary for 14 pixels. On the other hand, if the compression is performed as shown in FIG. 6B, the 14-pixel data can be compressed to 124 bits.

Next, the image signal processing unit 101 is described.

The compressed data 23 provided from the compression unit 3 is stored into the storage unit 102 via the internal bus 10 and the memory controller 9, and also provided to the de-compression unit 4. The de-compression unit 4 de-compresses the compressed data 23.

The de-compression unit 4 de-compresses the compressed data 23 to generate de-compressed data 32.

The camera signal processing unit 5 performs predetermined image processing (image quality correction and the like) on the input de-compressed data 32 (raw data) to generate corrected image data 33. The camera signal processing unit 5 provides the resulting corrected image data 33 to the storage unit 102 via the internal bus 10.

Figure 7:
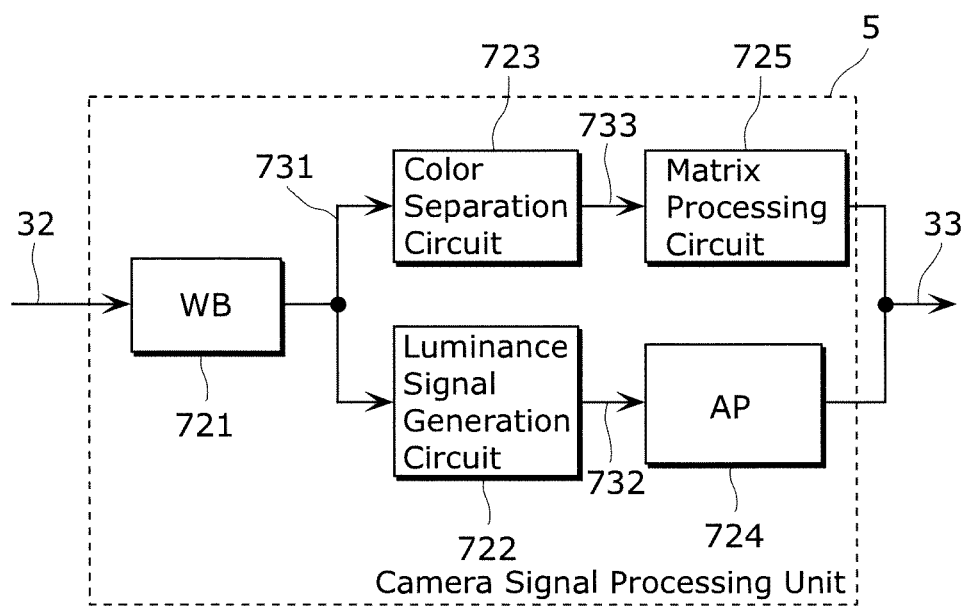
FIG. 7 is a block diagram of a camera signal processing unit according to Embodiment 1 of the present invention.

FIG. 7 is a block diagram showing the structure of the camera signal processing unit 5.

In general, as shown in FIG. 7, the camera signal processing unit 5 includes a white balance processing circuit 721 (WB in the figure), a luminance signal generation circuit 722, a color separation circuit 723, an aperture correction circuit 724 (AP in the figure), and a matrix processing circuit 725.

The white balance processing circuit 721 corrects a ratio of color components of color filters in the imaging device 1, so that a white object is imaged as white under any light source, thereby generating corrected signal 731.

The luminance signal generation circuit 722 generates luminance signal 732 (Y signal) from the raw data (corrected signal 731).

The color separation circuit 723 generates chrominance signal 733 (Cr/Cb signal) from the raw data (corrected signal 731).

The aperture correction circuit 724 adds the luminance signal 732 generated by the luminance signal generation circuit 722 with high-frequency components to increase a resolution.

The matrix processing circuit 725 adjusts spectroscopic properties of the imaging device 1 or hue balance lost in image processing, for the chrominance signal 733 generated by the color separation circuit 723.

The resolution conversion unit 6 increases and decreases a size of image.

The image coding unit 7 performs compression-conversion according to a predetermined standard such as PEG on the data stored in the storage unit 102 to generate image data, and provides the generated image data into the recording storage unit 103.

In general, the image signal processing unit 101 often temporarily stores the pixel data to be processed, into a memory (storage unit 102) such as a SDRAM, and performs the predetermined image processing, YC signal generation, zooming, and the like on the temporarily stored data, and temporarily stores the processed data again into the SDRAM. Therefore, the processing units are connected to one another via the internal bus 10.

At the same time, the video encoder resolution 8 is a display unit that displays, on a LCD, a monitor, or the like, the size-increased or size-decreased image provided from the resolution conversion unit 6.

Figure 8:
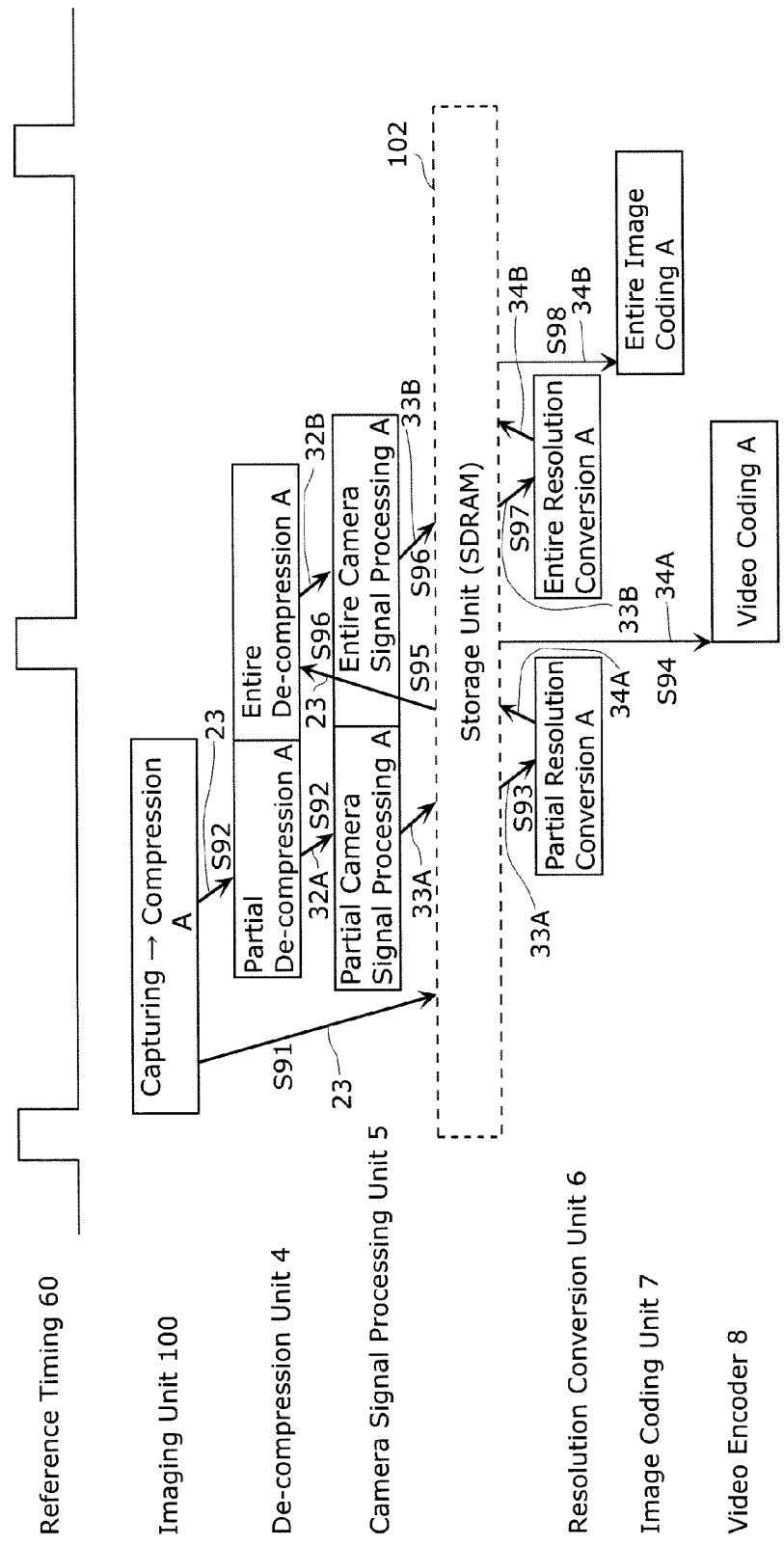
FIG. 8 is a time chart of processing performed by the imaging apparatus according to Embodiment 1 of the present invention.

Next, the flow of steps performed by the imaging apparatus 50 is described. FIG. 8 is a time chart of steps according to the present embodiment.

First, the imaging unit 100 retrieves image data 22 of an picture A at a rising of the reference timing 60, and then compresses the retrieved image data 22 to generate compressed data 23. In addition, the imaging unit 100 stores the generated compressed data 23 to the storage unit 102 (S91).

At the same time, the imaging unit 100 provides the compressed data 23 to the de-compression unit 4. The de-compression unit 4 de-compresses only designated data 40 that is a part of the compressed data 23 to generate partial de-compressed data 32A. Next, the camera signal processing unit 5 performs camera signal processing (image quality correction) on the generated partial de-compressed data 32A to generate partial corrected image data 33A, and provides it to the storage unit 102 (S92). For example, the designated data 40 is partial data included in each compressed packing data 23A. More specifically, the designated data 40 is the initial pixel value 22B.

Next, the resolution conversion unit 6 reads the partial corrected image data 33A from the storage unit 102, then performs zoom processing on it to generate partial converted image data 34A, and stores the generated partial converted image data 34A to the storage unit 102 (S93). Next, the video encoder 8 displays the partial converted image data 34A stored in the storage unit 102 (S94).

Furthermore, after the partial de-compression at Step S92, the de-compression unit 4 reads the compressed data 23 of the picture A from the storage unit 102 (S95), and de-compresses the compressed data 23 in whole to generate entire de-compressed data 32B. Next, the camera signal processing unit 5 performs camera signal processing on the generated entire de-compressed data 32B to generate entire corrected image data 33B, and stores it to the storage unit 102 (S96).

Likewise, after the zoom processing for the partial de-compressed data 32A (S93), the resolution conversion unit 6 reads the entire corrected image data 33B from the storage unit 102. Then, the resolution conversion unit 6 performs resolution conversion on the readout entire corrected image data 33B to generate entire converted image data 34B, and stores it to the storage unit 102 (S97).

Next, the image coding unit 7 codes the entire converted image data 34B stored in the storage unit 102 to generate coded image data, and records it onto the recording storage unit 103 (S98).

In recent years, an image size has been increased. For example, in the case of data amount of resolution (horizontally: 4480, vertically: 3360) of approximately 15 MPixel, even if a pixel to be temporarily de-compressed is the initial pixel value 22B only, it causes a data amount of ⅐ in the case of FIG. 2. Therefore, since 4480/7=640 and 3360/7=480, it is possible to adequately obtain a resolution VGA (640×480) of standard monitors such as National Television System Committee (NTSC) in the USA.

As a result, the imaging apparatus 50 according to the present embodiment can display images faster than the case where signal processing is performed on an entire picture.

It should be noted that data to be partially de-compressed may be the designated data 40 regarding predetermined plural designated pixels in arbitrary number from among the pieces of data included in the compressed packing data 23A. For example, if pieces of pixel data 22A compressed into a single piece of compressed packing data 23A are continuously arranged, the pieces of designated pixels may be arranged at regular intervals (for example, at every other pixels).

Figure 9A:
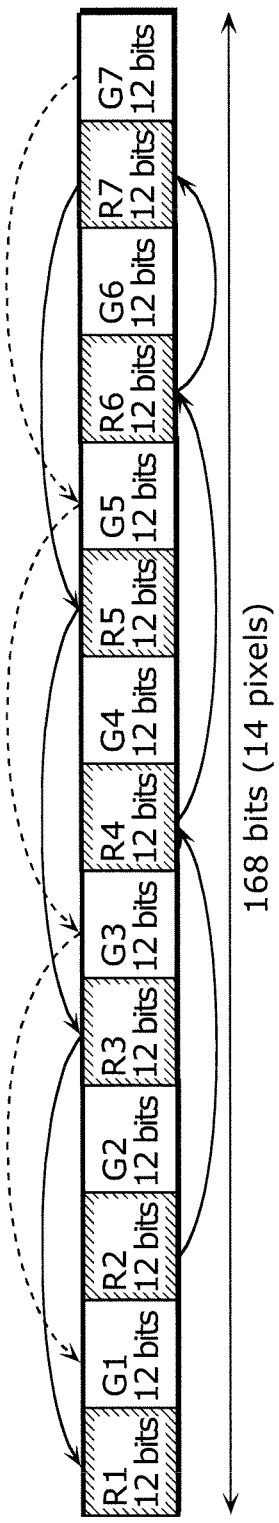
FIG. 9A is a diagram showing an example of data that has not yet been compressed according to Embodiment 1 of the present invention.
Figure 9B:
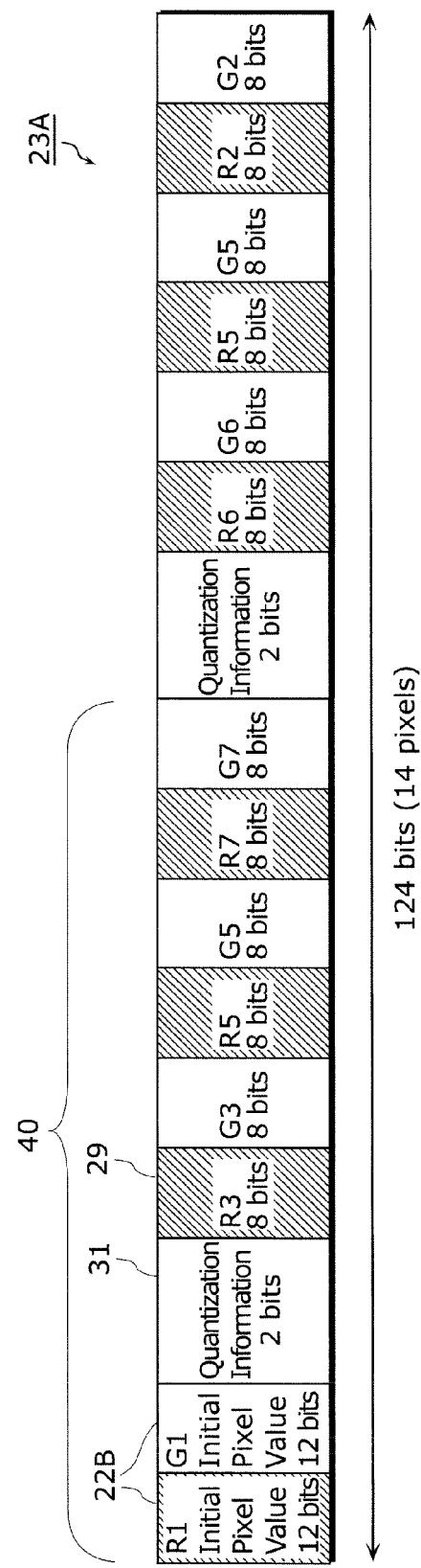
FIG. 9B is a diagram showing an example of compressed packing data according to Embodiment 1 of the present invention.

This is because the use of only initial pixel values 22B is simple thinning of pixel data and therefore there is a possibility of aliasing (folding noise). Therefore, the compression unit 3 may compress pieces of pixel data 22A in orders as shown in FIGS. 9A and 9B. In other words, the compression unit 3 first compresses designated pixels only in succession before compressing other pixels.

In this case, the de-compression unit 4 may de-compress only pieces of designated data 40 corresponding to first-half four pixels of each color included in one compressed packing data 23A (R1, R3, R5, R7, G1, G3, G5, G7). Therefore, although the number of pixels to be partially de-compressed is increased, a total data amount to be de-compressed can be reduced to approximately ⁴⁄₇. Furthermore, it is therefore possible to obtain image with further reduced noise.

Figure 10:
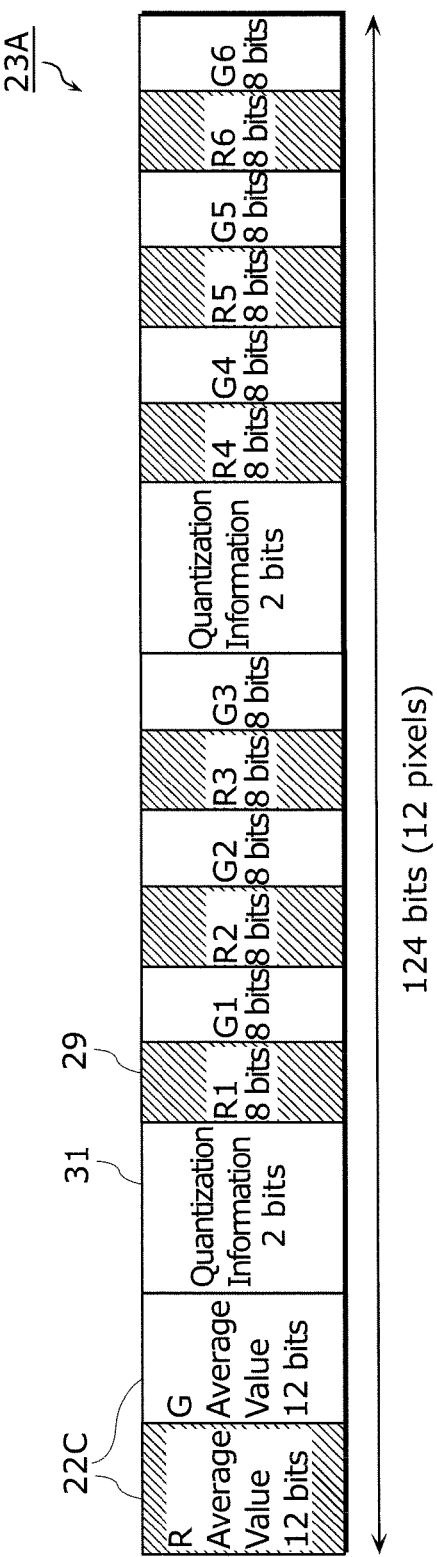
FIG. 10 is a diagram showing an example of compressed packing data according to Embodiment 1 of the present invention.

It should also be noted as shown in FIG. 10 that the compression unit 3 may calculate an average value 22C of pieces of pixel data 22A included in the compressed packing data 23A, and use the average value 22C as a reference pixel value instead of the initial pixel value 22B. In this case, the de-compression unit 4 may partially de-compress the average value 22C that is the reference pixel value. As described above, by using the average value 22C as the reference pixel value, it is possible to obtain image with suppressed aliasing by using data of all pixels in the compressed packing data 23A, although de-compression efficiency is deteriorated by the average value 22C.

Figure 11:
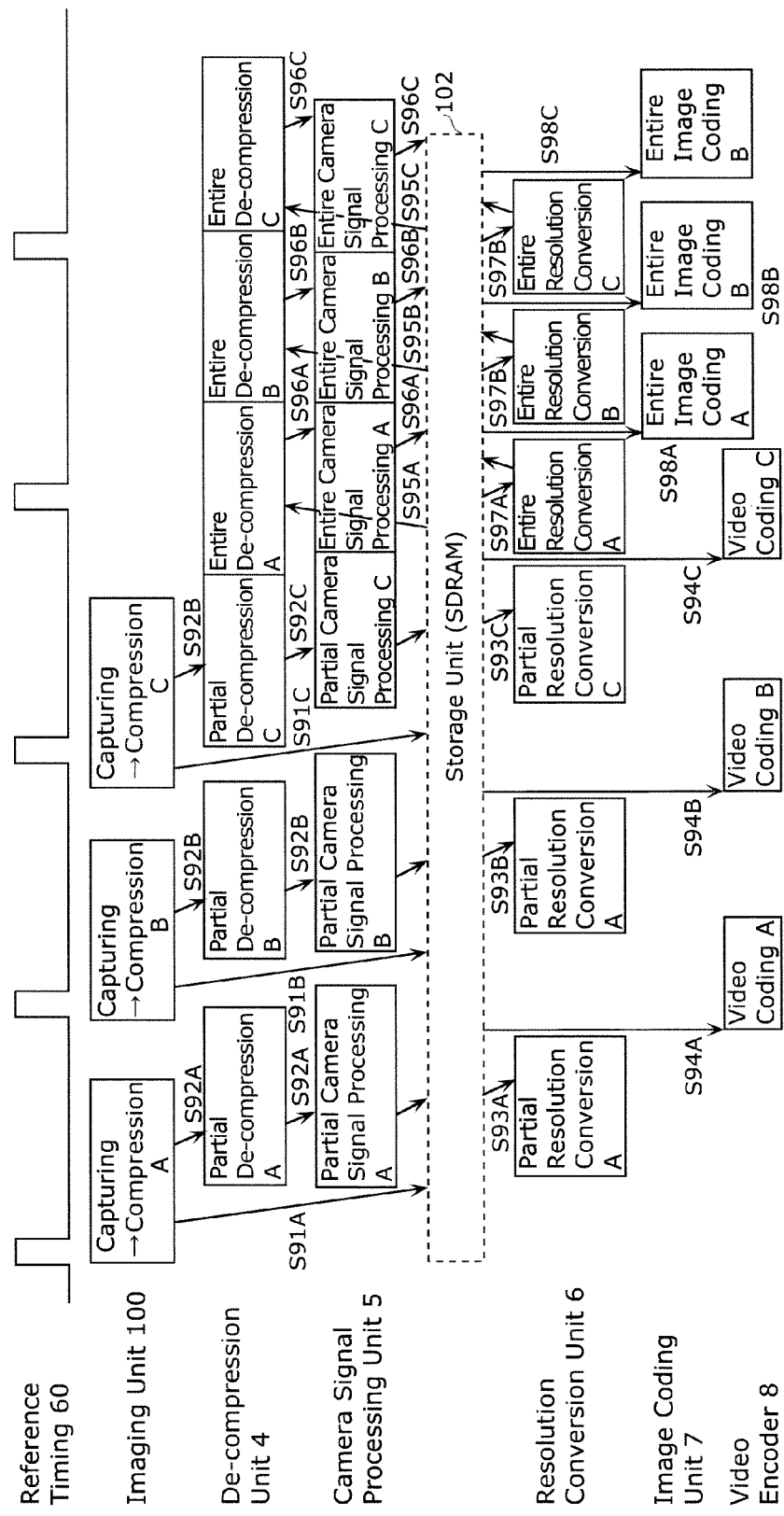
FIG. 11 is a time chart of another example of processing performed by the imaging apparatus according to Embodiment 1 of the present invention.

FIG. 11 shows another example of timings of steps according to the present embodiment.

As shown in FIG. 11, first, the imaging unit 100 retrieves image data 22 of the picture A at a rising of the reference timing 60, and then compresses the retrieved image data 22 to generate compressed data 23. In addition, the imaging unit 100 stores the generated compressed data 23 to the storage unit 102 (S91A). The subsequent steps up to S94A are the same as the steps S91 to S94 in FIG. 8. Next, the same steps (S91B to S94B) are performed for the picture B, and then the same steps (S91C to S94C) are performed for the picture C. In other words, when imaging and recording are continuously performed, the processing of steps S91 to S94 is repeated.

Until the above-described steps S91A to S94C have been completed, the compressed data 23 in whole is stored in the storage unit 102. Then, after the completion of the continuous imaging and recording, the processing from the entire de-compression (S95) to the entire coding (S98) is repeated for the recorded pictures. In other words, the processing from the entire de-compression (S95A) to the entire coding (S98A) for the picture A, the processing from the entire de-compression (S95B) to the entire coding (S98B) for the picture B, and the processing from the entire de-compression (S95C) to the entire coding (S98C) for the picture C are sequentially performed.

As a result, the imaging apparatus 50 according to the present embodiment can display images faster than the case where signal processing is performed on the entire image. Furthermore, since compressed data is stored in the storage unit 102 such as a SDARM, it is possible to reduce a data amount recorded on the storage unit 102. Moreover, the storage unit 102 can accumulate more data.

Figure 12:
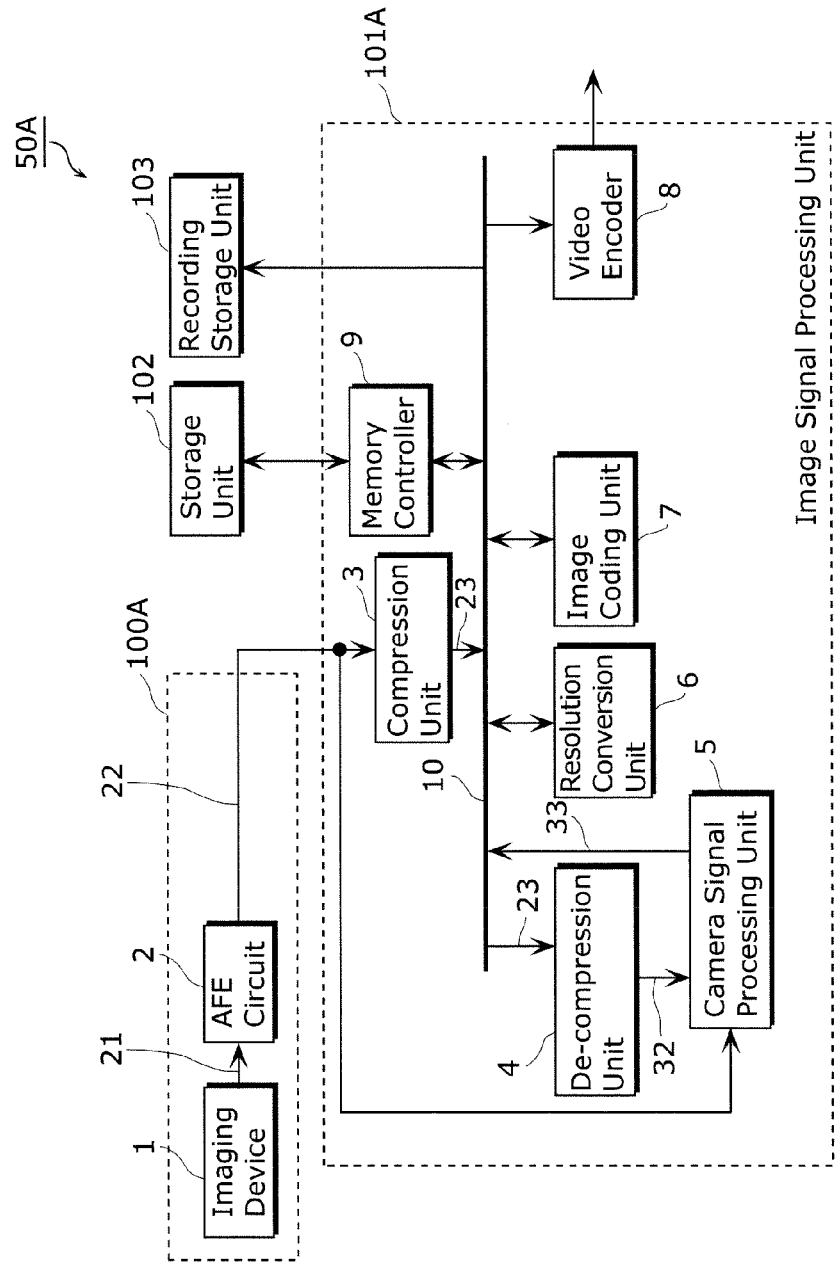
FIG. 12 is a block diagram of an imaging apparatus according to a variation of Embodiment 1 of the present invention.

FIG. 12 shows a variation of Embodiment 1.

An imaging apparatus 50A shown in FIG. 12 differs from the imaging apparatus 50 shown in FIG. 1 in the structure of an imaging unit 100A and an image signal processing unit 101A. More specifically, the compression unit 3 is included in not the imaging unit 100A but the image signal processing unit 101A.

In addition, a part of image data 22 from the AFE circuit 2 is provided directly to the camera signal processing unit 5. As a result, in generating display data, the processing does not need the de-compression unit 4, so that it is possible to perform display faster.

Embodiment 2

In Embodiment 2, the description is give for a variation of the de-compression unit 4 and the camera signal processing unit 5 which have been described in Embodiment 1.

Figure 13:
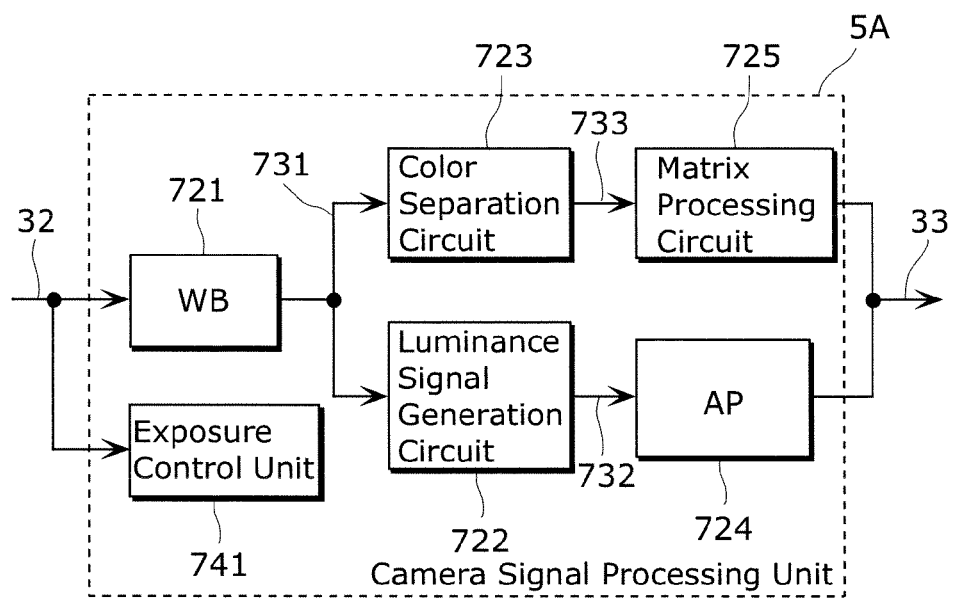
FIG. 13 is a block diagram of a camera signal processing unit according to Embodiment 2 of the present invention.

FIG. 13 is a block diagram showing a structure of a camera signal processing unit 5A according to Embodiment 2. The camera signal processing unit 5A shown in FIG. 13 differs from the camera signal processing unit 5 shown in FIG. 7 in further including an exposure control unit 741.

The exposure control unit 741 calculates a luminance level of the image data 22 using the partial de-compressed data 32A, and controls an exposure amount (light exposure amount) of the imaging device 1 so that the image data 22 has a predetermined luminance level.

Figure 14:
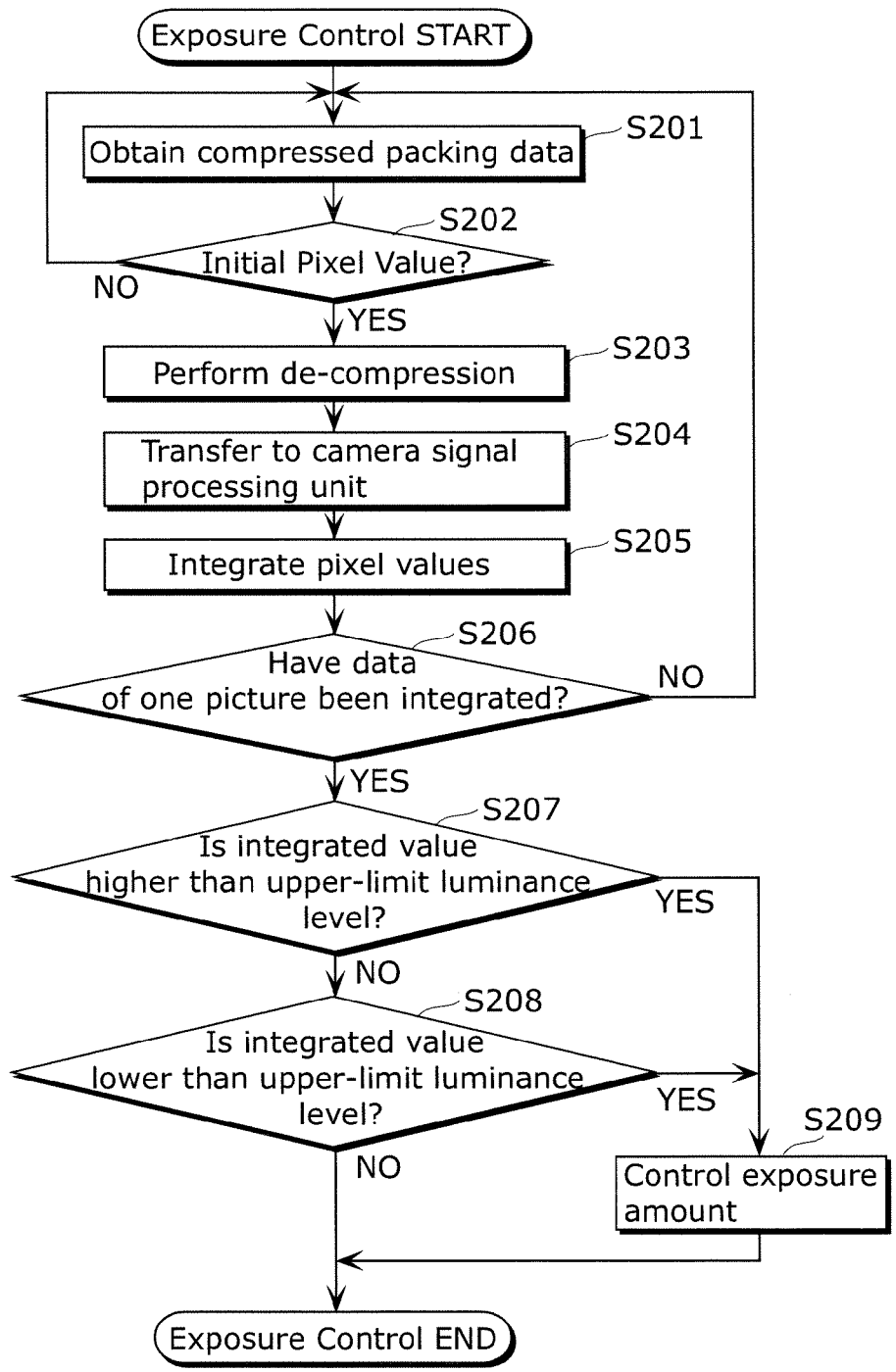
FIG. 14 is a flowchart of exposure control according to Embodiment 2 of the present invention.

FIG. 14 is a flowchart of the exposure control performed by the imaging apparatus 50 according to Embodiment 2.

First, at Step S201, the de-compression unit 4 receives compressed packing data 23A from the compression unit 3.

Next, at Step S202, the de-compression unit 4 determines whether or not each piece of data included in the compressed packing data 23A is an initial pixel value 22B (designated data 40). If the target piece is an initial pixel value 22B (Yes at S202), then the de-compression unit 4 proceeds to step S203. On the other hand, if the target piece is not an initial pixel value 22B (No at S202), then the processing returns to the step (S201) to receive a next piece of compressed packing data to obtain a next initial pixel value 22B.

At step S203, the de-compression unit 4 de-compresses only the initial pixel value 22B.

Then, at step S204, the de-compression unit 4 provides the de-compresses initial pixel value 22B to the camera signal processing unit 5A. Next, the exposure control unit 741 integrates such received initial pixel values 22B (S205).

The processing of steps S201 to S204 is repeated until the exposure control unit 741 integrates initial pixel values 22B included in one picture (S206).

After integrating the initial pixel values 22B of one picture (YES at S206), then the exposure control unit 741 determines whether or not the integrated value is greater than an upper-limit luminance level (S207). In addition, the exposure control unit 741 determines whether or not the integrated value is smaller than a lower-limit luminance level (S208). In other words, the exposure control unit 741 determines whether or not the integrated value is within a predetermined luminance level range.

If the integrated value is beyond the predetermined luminance level range (YES at S207 or YES at S208), then the exposure control unit 741 controls the exposure to control the imaging device 1 (S209).

On the other hand, if the integrated value is within the predetermined luminance level range (NO at S207 and NO at S208), the imaging apparatus 50 terminates the exposure control.

As described above, the imaging apparatus 50 according to Embodiment 2 of the present invention can generate display image and also control an exposure amount at the same time.

Figure 15:
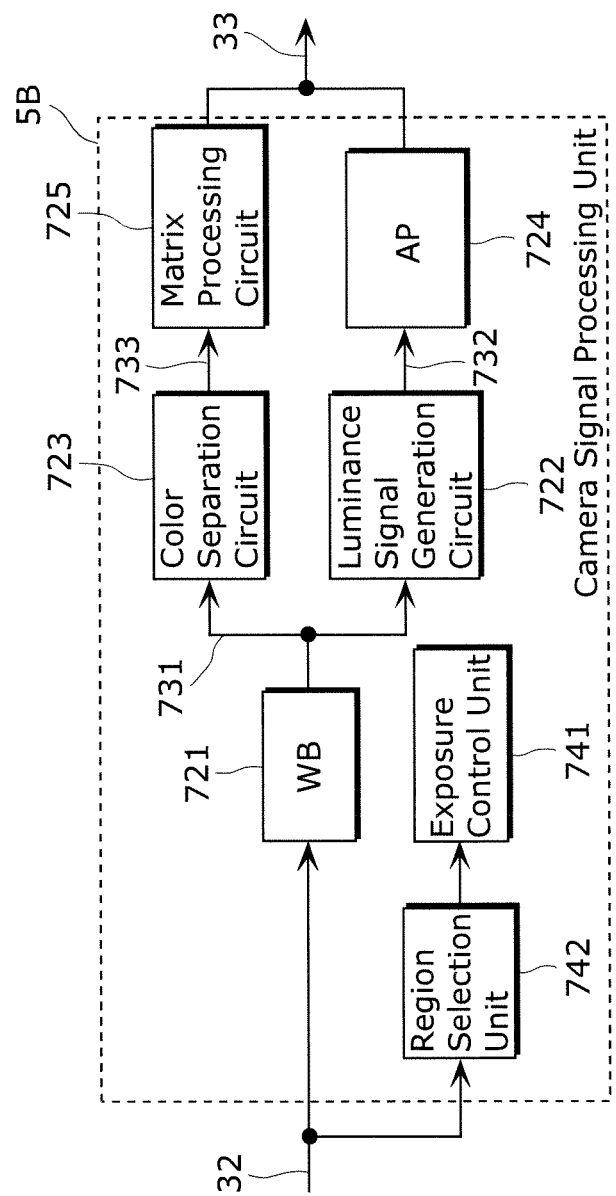
FIG. 15 is a block diagram of a camera signal processing unit according to a variation of Embodiment 2 of the present invention.

It should be noted that in the same manner as the camera signal processing unit 5B shown in FIG. 15, the imaging apparatus 50 may include a region selection unit 742 that selects an integration region 750 to be used for the exposure control. In this case, for example, the region selection unit 742 selects the integration region 750 at the center of the picture shown in FIG. 16. Furthermore, the exposure control unit 741 integrates only luminance values of initial pixel values 22B included in the integration region 750 selected by the region selection unit 742, and thereby performs the above-described exposure control according to the integrated value. Therefore, the imaging apparatus 50 can adjust an exposure amount according to brightness of only the integration region 750 at an arbitrary position in a picture.

Furthermore, as shown in FIG. 10, the reference pixel value may be the average value 22C of the pieces of pixel data 22A included in the compressed packing data 23A. In this case, the imaging apparatus 50 can control an exposure amount based on the average value 22C of the entire packing data.

Moreover, as shown in FIG. 9B, the designated data 40 may include a plurality of designated pixels.

Embodiment 3

In Embodiment 3, the description is give for another variation of the de-compression unit 4 and the camera signal processing unit 5 which have been described in Embodiment 1.

It is assumed in Embodiment 3 that the compressed packing data 23A includes a plurality of designated pixel values as shown in FIG. 9B.

Figure 17:
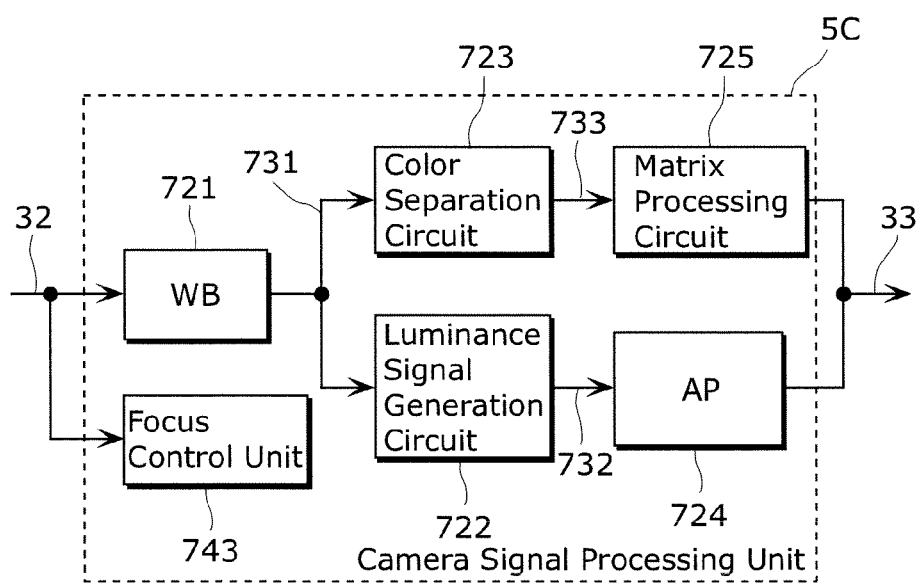
FIG. 17 is a block diagram of a camera signal processing unit according to Embodiment 3 of the present invention.

FIG. 17 is a block diagram showing a structure of a camera signal processing unit 5C according to Embodiment 3. The camera signal processing unit 5C shown in FIG. 17 differs from the camera signal processing unit 5 shown in FIG. 7 in further including a focus control unit 743.

The focus control unit 743 calculates frequency properties of pieces of pixel data 22A included in partial de-compressed data 32A, and thereby performs focus control using the frequency properties.

Figure 18:
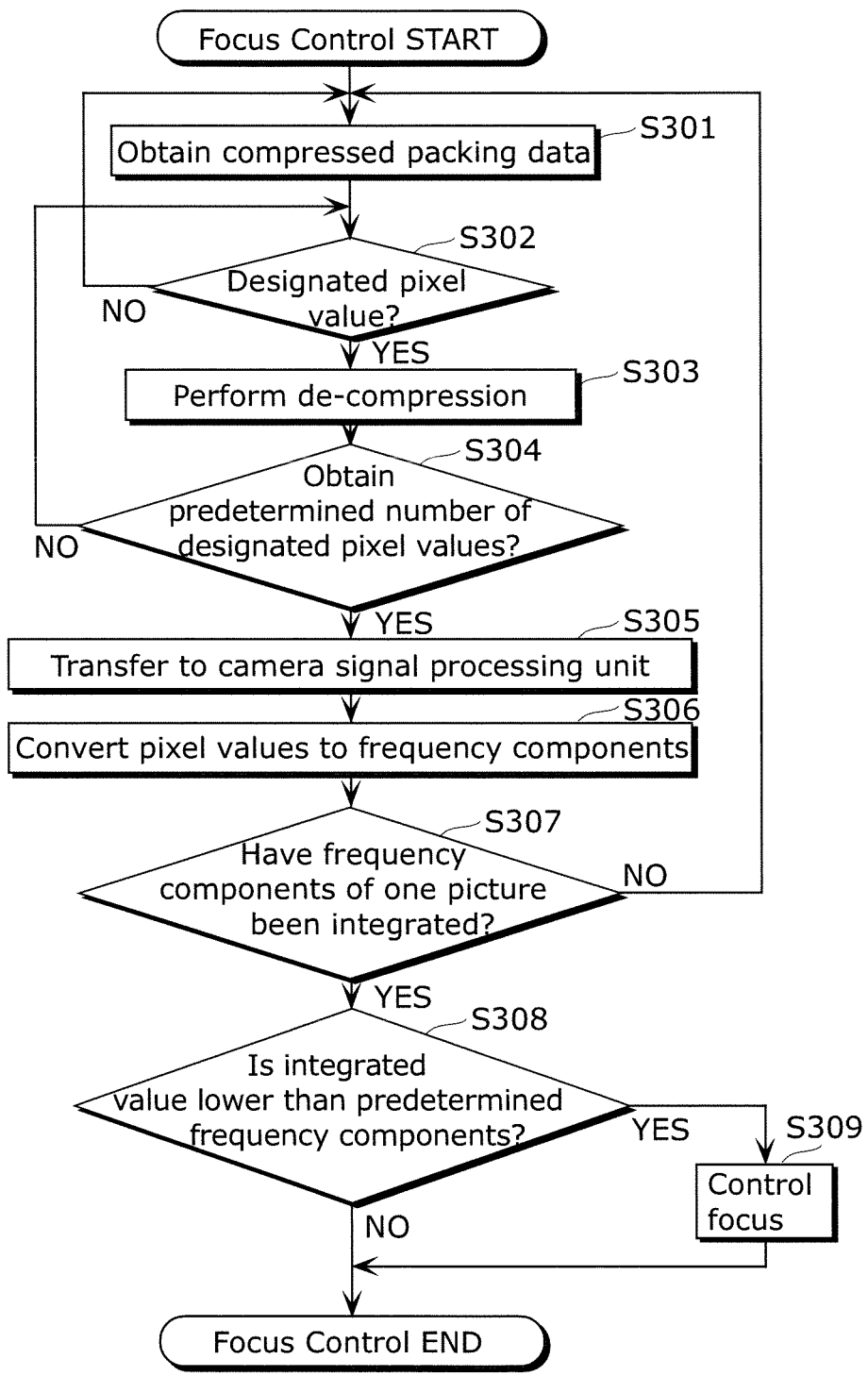
FIG. 18 is a flowchart of focus control according to Embodiment 3 of the present invention.

FIG. 18 is a flowchart of the focus control performed by the imaging apparatus 50 according to Embodiment 3.

First, at Step S301, the de-compression unit 4 receives compressed packing data 23A from the compression unit 3. Next, at step S302, the de-compression unit 4 determines whether or not each piece of data included in the compressed packing data 23A is a designated pixel value.

If the target piece is a designated pixel value (Yes at S302), then the de-compression unit 4 de-compresses the designated pixel value at Step S303. On the other hand, if the target piece is not a designated pixel value (No at S302), then the processing returns to the step (S301) to receive a next piece of compressed packing data to obtain a next designated pixel value.

Next, at step S304, the de-compression unit 4 determines whether or not an arbitrary (predetermined) number of designated pixel values in the compressed packing data 23A have been obtained. If the arbitrary number of designated pixel values have been obtained (Yes at S304), then the de-compression unit 4 proceeds to S305. On the other hand, if the arbitrary number of designated pixel values have not yet been obtained (No at S304), then the de-compression unit 4 returns to step S302 to de-compress a designated pixel value at a next position.

At step S305, the de-compression unit 4 provides the de-compressed image data to the camera signal processing unit 5C. The camera signal processing unit 5C converts the obtained pixel data into frequency components by orthogonal transformation or the like (S306). Furthermore, until frequency components included in one picture have been integrated, the processing of steps S301 to S306 is repeated (S307).

If the frequency components in one picture have been integrated (YES at S307), then the focus control unit 743 determines whether or not the integrated value is lower than a predetermined level (S308). If the integrated value is lower than the predetermined frequency component level, the focus control unit 743 controls a lens position of the imaging device 1 to control focus (S309).

On the other hand, if the integrated value is higher than the predetermined frequency component level (No at S308), then the imaging apparatus 50 terminates the focus control.

As described above, the imaging apparatus 50 according to Embodiment 3 of the present invention can generate display image and also control focus.

Figure 16:
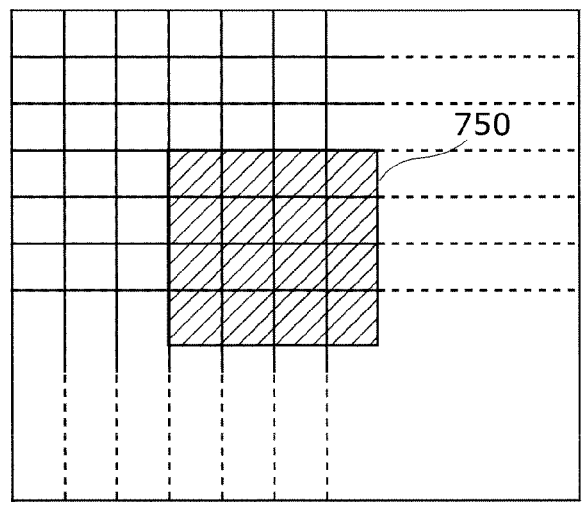
FIG. 16 is a diagram showing an example of a multiplication region according to Embodiment 2 of the present invention.

It should be noted that in the same manner as the camera signal processing unit 5A shown in FIG. 15, the camera signal processing unit 5C may include a region selection unit 742 that selects an integration region to be used. In this case, luminance values of designated pixel values at arbitrary positions in the mage shown in FIG. 16 are integrated, and it is thereby possible to adjust focus, for example, only at the center of the image.

It should also be noted that the data de-compressed by the de-compression unit 4 may be the initial pixel value 22B or the average value 22C.

Embodiment 4

In Embodiment 4, the description is give for a variation of the de-compression unit 3 and the de-compression unit 4 which have been described in Embodiment 1.

Figure 19:
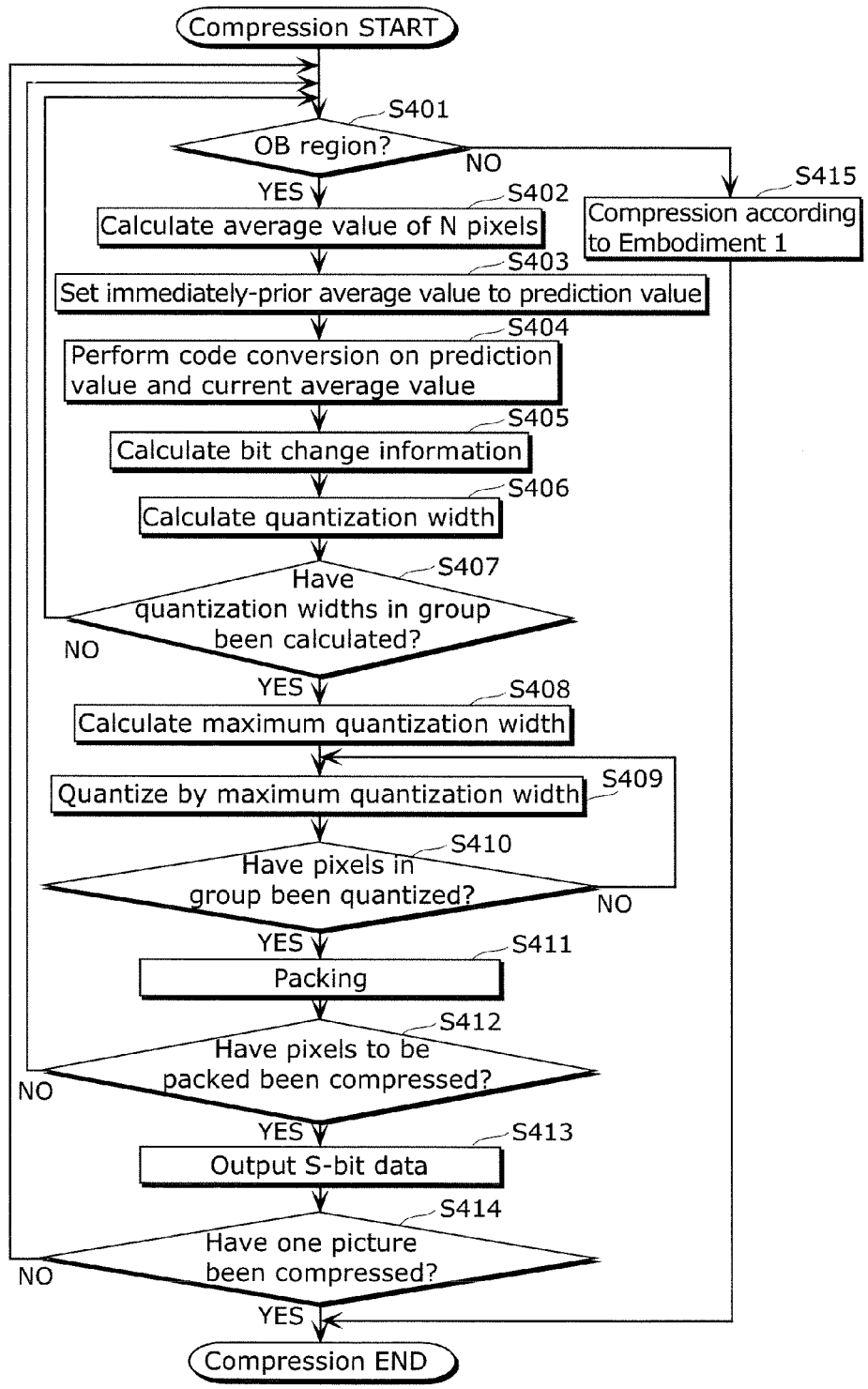
FIG. 19 is a flowchart of compression according to Embodiment 4 of the present invention.

FIG. 19 shows a flow of the processing performed by the imaging apparatus 50 according to Embodiment 4.

Figure 20:
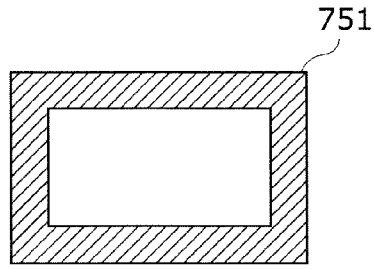
FIG. 20 is a diagram showing an example of a light-blocking region according to Embodiment 4 of the present invention.

First, at step S401, the compression unit 3 determines whether or not a current pixel to be coded is a pixel in a light-blocking region. In general imaging apparatuses, in order to determine a black level in an image, there is a light-blocking region 751 (OB region) which is upper, lower, and side regions of the imaging device 1 as shown in FIG. 20. The imaging apparatus 50 calculates, as a black level, an average value of pieces of light-blocking pixel data 22D which are pieces of pixel data 22A of pixels included in the light-blocking region 751, and subtracts the black level from pieces of pixel data 22A in an actually captured region to adjust a level of each pixel. Therefore, for the light-blocking region 751, an average value of the pixels not a pixel level of each pixel is necessary.

If the current pixel data is not light-blocking pixel data 22D (NO at S401), then the compression unit 3 performs the same processing as that in Embodiment 1 shown in FIG. 3 (S415).

On the other hand, if the current pixel data is light-blocking pixel data 22D (YES at S401), then at step S402, the compression unit 3 calculates average values of pieces of light-blocking pixel data 22D of N pixels. In the example shown in FIG. 21, the compression unit 3 calculates an average value of pieces of light-blocking pixel data 22D of four pixels.

In the processing from step S403, the compression unit 3 performs fixed length coding on a plurality of calculated average values to generate compressed data 23.

Figure 21:
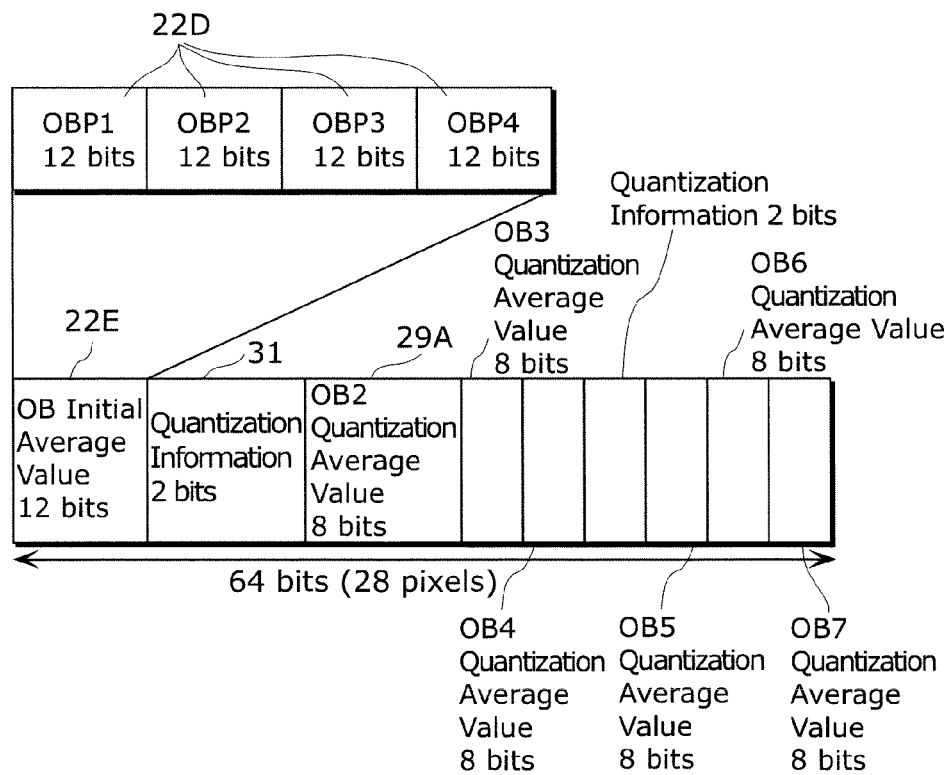
FIG. 21 is a diagram showing an example of compressed packing data according to Embodiment 4 of the present invention.

It should be noted that the processing from step S403 to step S414 is the same as the processing from step S102 to step S113 shown in FIG. 3 in which a target to be coded is replaced from pixel data 22A to an average value of N pixels, so that the processing is not described again below. It should also be noted that the initial average value 22E shown in FIG. 21 is an average value of pixels P1 to P4. Moreover, for example, the de-compression unit 4 de-composes only the initial average value 22E to generate partial de-compressed data 32A. Furthermore, the quantized average value 29A is, for example, a quantized value of the average value of pixels P5 to P8.

As described above, the imaging apparatus 50 according to Embodiment 4 of the present invention calculates an average value regarding pieces of pixel data 22A of the light-blocking region 751 and compresses the average value. Therefore, the imaging apparatus 50 according to Embodiment 4 of the present invention can reduce a data amount regarding the light-blocking region 751.

It should be noted that it has been described above that the compression unit 3 compresses an average value for the light-blocking region 751, but it is also possible that the compression unit 3 calculates at least one of a maximum value and a minimum value of pixel data 22A per N pixels, and performs fixed length coding on the calculated minimum value and/or maximum value to generate compressed data 23.

Embodiment 5

In Embodiment 5 of the present invention, the description is given for an imaging system 500 including the above-described imaging apparatus 50.

Figure 22:
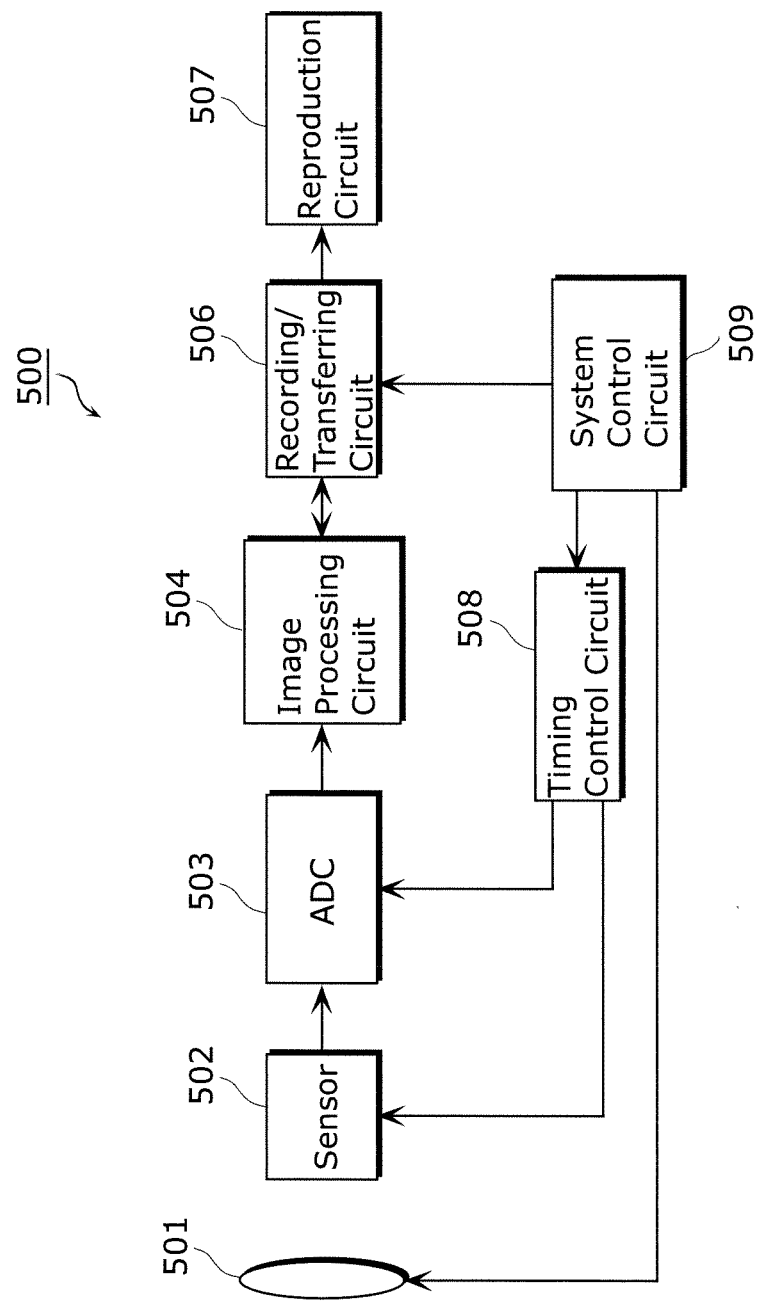
FIG. 22 is a block diagram of an imaging system according to Embodiment 5 of the present invention.

FIG. 22 is a block diagram showing a structure of the imaging system 500 (for example, a digital still camera (DSC)) according to Embodiment 5 of the present invention.

The imaging system 500 shown in FIG. 22 includes an optical system 501, an image sensor 502, an analog/digital converter (ADC) 503, an image processing circuit 504, a recording/transferring circuit 506, a system control circuit 507, a timing control circuit 508, and a reproduction circuit 509.

Here, the image sensor 502 corresponds to the imaging device 1 shown in FIG. 1. The ADC 503 corresponds to the AFE circuit 2. The image processing circuit 504 corresponds to the image signal processing unit 101. The recording/transferring circuit 506 corresponds to the recording storage unit 103.

The entire imaging system 500 is controlled by a system control circuit 507.

In the imaging system 500, an object image light incident through the optical system 501 is imaged on the image sensor 502. The image sensor 502 is driven by the timing control circuit 508 to accumulate optical data of the resulting object image and convert the optical data into electric signals. The electric signals read by the image sensor 502 is converted by the analog/digital converter 503 to digital signals, and then provided to the image processing circuit 504. The image processing circuit 504 performs the de-compression according to the present invention, the camera signal processing, the Y/C processing, edge processing, image size increasing/decreasing, image compression/de-compression, and the like. The recording/transferring circuit 506 records the image-processed signals onto a medium, or transfers it to a network. The reproduction circuit 509 reproduces the recorded or transferred signals.

It should be noted that the image processing performed by the image processing circuit 504 according to the embodiment of the present invention is not necessarily applied only to signals based on an object image imaged on the image sensor 502 via the optical system 501. For example, of course, the image processing can be used in processing image signals inputted as electric signals from an external apparatus.

It should be noted that processing units included in the imaging apparatus and the imaging system according to the above-described Embodiments 1 to 5 are typically implemented into a Large Scale Integration (LSI) which is an integrated circuit. These may be integrated separately, or a part or all of them may be integrated into a single chip.

It should also be noted that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

It should also be noted that a part of all of the functions of the imaging apparatus and the imaging system according to Embodiments 1 to 5 of the present invention may be implemented by executing a program by a processor such as a Central Processing Unit (CPU).

The present invention may be the above-described program or a recording medium on which the program is recorded. Of course, the program can be distributed via a transmission medium such as the Internet.

It is also possible to combine at least part of the functions of the imaging apparatus and the imaging system according to the above-described Embodiments 1 to 5 and their variations.

It should also be noted that all of the above-described numeral values are examples for describing the present invention in more detail, so that the present invention is not limited to these numeral values.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention can be applied to imaging apparatuses. More especially, The present invention can be applied to apparatuses handling images, such as digital still cameras and network cameras.

The invention claimed is:

1. An imaging apparatus comprising:
an imaging device that generates first image data according to incident light;
a compression unit configured to perform fixed length coding on the first image data to generate first compressed data;
a storage unit configured to store the first compressed data;
a de-compression unit configured to de-compress only first designated data that is a part of the first compressed data so as to generate first partial de-compressed data without passing through the storage unit;
a signal processing unit configured to correct image quality of the first partial de-compressed data to generate first partial corrected image data; and
a display unit configured to display the first partial corrected image data.

2. The imaging apparatus according to claim 1,
wherein the de-compression unit is configured, after generating the first partial de-compressed data, to de-compress the first compressed data in whole stored in the storage unit to generate first entire de-compressed data, and
the signal processing unit is configured to correct image quality of the first entire de-compressed data to generate first entire corrected image data.

3. The imaging apparatus according to claim 1,
wherein the compression unit is configured, per pixel data group that is a part of pieces of pixel data included in the first image data, to compress pieces of pixel data included in the pixel data group so as to generate pieces of unit compressed data each having a fixed length, and
the first designated data is a part of each of the pieces of unit compressed data.

4. The imaging apparatus according to claim 3,
wherein the compression unit is configured to calculate bit change information indicating a difference between a prediction value and pixel data of a current pixel to be coded, and quantize the calculated bit change information to obtain a quantized value having a fixed length,
each of the pieces of unit compressed data includes: a reference pixel value that is pixel data to be used as the prediction value; quantization values including the quantized value which correspond to pieces of the pixel data included in the pixel data group; and quantization information indicating conditions of the quantization, and
the first designated data includes the reference pixel value.

5. The imaging apparatus according to claim 4,
wherein the reference pixel value is one piece of pixel data included in the pixel data group, and
each of the pieces of unit compressed data includes: the reference pixel value; the quantized values corresponding to pieces of the pixel data included in the pixel data group except the one piece of pixel data; and the quantization information.

6. The imaging apparatus according to claim 4,
wherein the compression unit is configured to calculate an average value of the pieces of pixel data included in the pixel data group, and
the reference pixel value is the average value.

7. The imaging apparatus according to claim 4,
wherein the pixel data group includes the pieces of pixel data of pixels which are continuously arranged, and
the first designated data includes: the reference pixel value; and the quantized values corresponding to pixels arranged at regular intervals.

8. The imaging apparatus according to claim 4,
wherein each of the pieces of pixel data is in corresponding one of different colors,
each of the pieces of unit compressed data includes respective reference pixel values in the different colors,
the first designated data includes respective reference pixel values in the different colors, and
the compression unit is configured to calculate the bit change information by using, as the prediction value, the reference pixel value in a same color as a color of the current pixel, and quantizes the calculated bit change information to obtain the quantized values having the fixed length.

9. The imaging apparatus according to claim 2,
wherein the imaging device further generates second image data according to another incident light,
the compression unit is further configured to perform fixed length coding on the second image data to generate second compressed data,
the storage unit is further configured to store the second compressed data,
the de-compression unit is further configured to de-compress only second designated data that is a part of the second compressed data so as to generate second partial de-compressed data,
the signal processing unit is further configured to correct image quality of the second partial de-compressed data to generate second partial corrected image data,
the display unit is further configured to display the second partial corrected image data,
the de-compression unit is configured, after generating the first partial de-compressed data and the second partial de-compressed data, to generate the first entire de-compressed data and de-compress the second compressed data in whole stored in the storage unit to generate second entire de-compressed data, and
the signal processing unit is further configured to correct image quality of the second entire de-compressed data to generate second entire corrected image data.

10. The imaging apparatus according to claim 1, further comprising
an exposure control unit configured to calculate a luminance level of the first image data using the first partial de-compressed data, and control an exposure amount of the imaging device so that the first image data has a predetermined luminance level.

11. The imaging apparatus according to claim 1, further comprising a focus control unit configured to calculate frequency properties of image data included in the first partial de-compressed data, and control focus by using the frequency properties.

12. The imaging apparatus according to claim 3,
wherein the first image data includes pieces of light-blocking pixel data of light-blocking pixels, and
the compression unit is configured, when the pieces of pixel data included in the pixel data group are the pieces of light-blocking pixel data, to calculate, per predetermined-number of light-blocking pixels, an average value of pieces of the light-blocking pixel data, and perform fixed length coding on the calculated averaged values to generate the first compressed data.

13. The imaging apparatus according to claim 3,
wherein the first image data includes pieces of light-blocking pixel data of light-blocking pixels, and
the compression unit is configured, when the pieces of pixel data included in the pixel data group are the pieces of light-blocking pixel data, to calculate, per predetermined-number of light-blocking pixels, one of a maximum value and a minimum value of pieces of the light-blocking pixel data, and perform fixed length coding on one of the calculated maximum values and the calculated minimum values to generate the first compressed data.

14. The imaging apparatus according to claim 1, further comprising
an analog-to-digital (AD) conversion unit configured to convert the first image data generated by the imaging device into digital signals,
wherein the compression unit is configured to compress the first image data converted by the AD conversion unit into the digital signals so as to generate the first compressed data having a fixed length.

* * * * *